(12) United States Patent
Sanda et al.

(10) Patent No.: US 11,849,345 B2
(45) Date of Patent: Dec. 19, 2023

(54) TERMINAL APPARATUS, BASE STATION APPARATUS, AND METHOD

(71) Applicants: SHARP KABUSHIKI KAISHA, Sakai (JP); FG Innovation Company Limited, Tuen Mun (HK)

(72) Inventors: Takako Sanda, Sakai (JP); Shohei Yamada, Sakai (JP); Hidekazu Tsuboi, Sakai (JP)

(73) Assignees: SHARP KABUSHIKI KAISHA, Sakai (JP); FG Innovation Company Limited, New Territories (HK)

( * ) Notice: Subject to any disclaimer, the term of this patent is extended or adjusted under 35 U.S.C. 154(b) by 9 days.

(21) Appl. No.: 17/266,606

(22) PCT Filed: Jul. 19, 2019

(86) PCT No.: PCT/JP2019/028538
§ 371 (c)(1),
(2) Date: Feb. 7, 2021

(87) PCT Pub. No.: WO2020/031665
PCT Pub. Date: Feb. 13, 2020

(65) Prior Publication Data
US 2021/0314805 A1    Oct. 7, 2021

(30) Foreign Application Priority Data
Aug. 7, 2018 (JP) .................................. 2018-148466

(51) Int. Cl.
*H04W 28/02* (2009.01)
*H04W 8/24* (2009.01)
(Continued)

(52) U.S. Cl.
CPC ..... *H04W 28/0236* (2013.01); *H04L 65/1104* (2022.05); *H04W 8/24* (2013.01); *H04W 80/02* (2013.01)

(58) Field of Classification Search
CPC ... H04W 28/0236; H04W 8/24; H04W 80/02; H04W 24/10; H04L 65/1104; H04L 43/062; H04L 43/065; H04L 43/0829
See application file for complete search history.

(56) References Cited

U.S. PATENT DOCUMENTS

2002/0191594 A1* 12/2002 Itoh ................. H04W 28/22
370/352
2005/0160184 A1* 7/2005 Walsh ................ H04L 69/22
709/247
(Continued)

FOREIGN PATENT DOCUMENTS

JP   2011055435 A   3/2011
JP   2015082747 A   4/2015
(Continued)

OTHER PUBLICATIONS

"Technical Specification Group Radio Access Network;Evolved Universal Terrestrial Radio Access (E-UTRA) and Evolved Universal Terrestrial Radio Access Network (E-UTRAN);Overall description;Stage 2 (Release 13)",3GPP Draft;DRAFT_36300-D90,3rd Generation Partnership Project, (3GPP),Mobile Competence Centre;650,Route Des Lucioles;F-06921 Sophia-Antipolis Cedex;France, Sep. 16, 2017, paragraphs [07.1], [10.6], [11.5],[0012], [22.2].
(Continued)

*Primary Examiner* — Eunsook Choi
(74) *Attorney, Agent, or Firm* — ScienBiziP, P.C.

(57) ABSTRACT

Provided is a technology related to a terminal apparatus, a base station apparatus, a method, and an integrated circuit capable of reducing complexity of protocol processing,
(Continued)

UE122

S1100
RECEIVE UE CAPABILITY ENQUIRY MESSAGE INCLUDING PACKET LOSS RATE REPORT FROM eNB 102
IN CASE THAT PACKET LOSS RATE REPORT IS SUPPORTED, CREATE UE CAPABILITY INFORMATION MESSAGE INCLUDING FIELD INDICATING PACKET LOSS RATE REPORT AND TRANSMIT UE CAPABILITY INFORMATION MESSAGE TO eNB 102

S1102
RECEIVE RRC CONNECTION RECONFIGURATION MESSAGE INCLUDING FIELD REPRESENTING CONFIGURATION FOR PACKET LOSS RATE REPORT FROM eNB 102
PERFORM PROCESSING OF CONFIGURING PACKET LOSS RATE REPORT, BASED ON FIELD REPRESENTING CONFIGURATION FOR PACKET LOSS RATE REPORT

S1104
IN CASE THAT REPORT RELATED TO PACKET LOSS RATE IS RECEIVED FROM HIGHER LAYER, CREATE PACKET LOSS RATE REPORT CONTENT ACCORDING TO CONTENT OF REPORT RECEIVED FROM HIGHER LAYER AND TRANSMIT PACKET LOSS RATE REPORT CONTENT TO eNB 102 reducing deterioration of phone call quality, and efficiently performing communication. A terminal apparatus for communicating with a base station apparatus includes: a reception unit configured to receive an RRC message from the base station apparatus; and a processing unit configured to configure a packet loss prohibit timer according to a packet loss rate report prohibit timer field included in the RRC message and configured to, based on reception of a report of a packet loss rate from a higher layer and a fact that a packet loss rate report prohibit timer is not running, create a packet loss rate report content, start the packet loss rate report prohibit timer, and perform transmission to the base station apparatus. The packet loss rate report content includes information of a direction for indicating whether the direction is an uplink direction or a downlink direction, and information of the packet loss rate.

20 Claims, 16 Drawing Sheets

(51) Int. Cl.
*H04W 80/02* (2009.01)
*H04L 65/1104* (2022.01)

(56) References Cited

U.S. PATENT DOCUMENTS

| | | | | |
|---|---|---|---|---|
| 2007/0275713 | A1* | 11/2007 | Tidwell | H04L 1/0026 455/425 |
| 2009/0274107 | A1* | 11/2009 | Park | H04W 8/24 370/352 |
| 2010/0098176 | A1* | 4/2010 | Liu | H04L 65/80 375/259 |
| 2013/0114446 | A1* | 5/2013 | Liu | H04W 24/10 370/252 |
| 2016/0127939 | A1 | 5/2016 | Bathwal et al. | |
| 2018/0270713 | A1* | 9/2018 | Park | H04W 74/0833 |
| 2018/0332479 | A1* | 11/2018 | Chai | H04W 16/14 |
| 2019/0281504 | A1* | 9/2019 | Su | H04W 52/28 |
| 2021/0144580 | A1* | 5/2021 | Alfarhan | H04W 80/02 |
| 2023/0007527 | A1* | 1/2023 | Baek | H04W 28/0273 |

FOREIGN PATENT DOCUMENTS

| | | |
|---|---|---|
| KR | 20090068317 A | 6/2009 |
| WO | 2009118707 A1 | 10/2009 |
| WO | 2013/047002 A | 4/2013 |
| WO | 2013/126284 A | 8/2013 |
| WO | 2017133501 | 8/2017 |

OTHER PUBLICATIONS

"3rd Generation Partnership Project;Technical Specification Group Services and System Aspects;Study on Media Handling Aspects of RAN Delay Budget Reporting in MTSI (Release 15)",3GPP Standard;Technical Specification;3GPP TR 26.910,3rd Generation Partnership Project (3GPP),Mobile Competence Centre;F-06921 Sophia-Antipolis Cedex;France,vol. SA WG4,No. V0.1.0,Feb. 8, 2018,pp. 1-11, paragraph [04.3].
"3rd Generation Partnership Project;Technical Specification Group Services and System Aspects; Release 14 Description; Summary of Rel-14 Work Items (Release 14)",3GPP Draft;S1-174007,3rd Generation Partnership Project (3GPP),Mobile Competence Centre;650,Route Des Lucioles;F-06921 Sophia-Antipolis Cedex; France,Nov. 27, 2017, paragraphs [9.1.2], [09.4].
Huawei,Hisilicon,Intel,China Unicom,CATT,China Mobile,Quaicomm Incorporated,Catr,Zte,Telia Company,Telecom Italia,Verizon Wireless,"Enhanced VoLTE performance CR for TS 23.401",3GPP TSG-SA2 Meeting#123,Ljubljana,Slovenia,Oct. 23-27, 2017,S2-177772.
3GPP TS 36.323, "3rd Generation Partnership Project; Technical Specification Group Radio Access Network; Evolved Universal Terrestrial Radio Access (E-UTRA); Packet Data Convergence Protocol (PDCP) specification (Release 15)", V15.0.0 (Jul. 2018).
3GPP TS 36.322, "3rd Generation Partnership Project; Technical Specification Group Radio Access Network; Evolved Universal Terrestrial Radio Access (E-UTRA); Radio Link Control (RLC) protocol specification (Release 15)", V15.1.0 (Jul. 2018).
3GPP TS 36.321, "3rd Generation Partnership Project; Technical Specification Group Radio Access Network; Evolved Universal Terrestrial Radio Access (E-UTRA); Medium Access Control (MAC) protocol specification (Release 15)", V15.2.0 (Jul. 2018).
3GPP TS 36.300, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", V15.2.0 (Jun. 2018).
3GPP TR 26.959, "3rd Generation Partnership Project; Technical Specification Group Services and System Aspects; Study on enhanced Voice over LTE (VoLTE) performance (Release 15)", V15.0.0 (Jun. 2018).
3GPP TS 23.502, "3rd Generation Partnership Project; Technical Specification Group Services and System Aspects; Procedures for the 5G System; Stage 2 (Release 15)", V15.2.0 (Jun. 2018).
3GPP TS 23.501, "3rd Generation Partnership Project; Technical Specification Group Services and System Aspects; System Architecture for the 5G System; Stage 2 (Release 15)", V15.2.0 (Jun. 2018).
3GPP TS 23.401, "3rd Generation Partnership Project; Technical Specification Group Services and System Aspects; General Packet Radio Service (GPRS) enhancements for Evolved Universal Terrestrial Radio Access Network (E-UTRAN) access (Release 14)", V14.3.0 (Mar. 2017).
3GPP TS 23.228, "3rd Generation Partnership Project; Technical Specification Group Services and System Aspects; IP Multimedia Subsystem (IMS); Stage 2 (Release 15)", V15.2.0 (Mar. 2018).
3GPP TS 23.216, "3rd Generation Partnership Project; Technical Specification Group Services and System Aspects; Single Radio Voice Call Continuity (SRVCC); Stage 2 (Release 15)", V15.2.0 (Jun. 2018).
3GPP TS 23.203, "3rd Generation Partnership Project; Technical Specification Group Services and System Aspects; Policy and charging control architecture (Release 15)", V15.3.0 (Jun. 2018).
Samsung, Miscellaneous corrections [online], 3GPP TSG RAN WG2 #102 R2-1807541, May 25, 2018, Section 5. 4. 6.
Huawei, Hi Silicon, Qualcomm, CR on Delay budget report and MAC CE adaptation for NR for TS 38.331 [online], 3GPP TSG RAN WG2 adhoc—Jul. 2018 _NR R2-1810289, Jul. 6, 2018.
3GPP TS 38.331, "3rd Generation Partnership Project; Technical Specification Group Radio Access Network; NR; Radio Resource Control (RRC) protocol specification (Release 15)", V15.2.1 (Jun. 2018).
NTT Docomo, Inc, "New WID on New Radio Access Technology", RP-170855, 3GPP TSG RAN Meeting #75 Dubrovnik, Croatia, Mar. 6-9, 2017.
3GPP TS 38.323, "3rd Generation Partnership Project; Technical Specification Group Radio Access Network; NR; Packet Data Convergence Protocol (PDCP) specification (Release 15)", V15.2.0 (Jun. 2018).
3GPP TS 38.322, "3rd Generation Partnership Project; Technical Specification Group Radio Access Network; NR; Radio Link Control (RLC) protocol specification (Release 15)", V15.2.0 (Jun. 2018).
3GPP TS 38.321, "3rd Generation Partnership Project; Technical Specification Group Radio Access Network; NR; Medium Access Control (MAC) protocol specification (Release 15)", V15.2.0 (Jun. 2018).
3GPP TS 38.300, "3rd Generation Partnership Project; Technical Specification Group Radio Access Network; NR; NR and NG-RAN Overall Description; Stage 2 (Release 15)", V15.2.0 (Jun. 2018).

(56) References Cited

OTHER PUBLICATIONS

3GPP TS 37.324, "3rd Generation Partnership Project; Technical Specification Group Radio Access Network; E-UTRA and NR; Service Data Adaptation Protocol (SDAP) specification (Release 15)", V15.0.0 (Jun. 2018).

3GPP TS 36.331, "3rd Generation Partnership Project; Technical Specification Group Radio Access Network; Evolved Universal Terrestrial Radio Access (E-UTRA); Radio Resource Control (RRC); Protocol specification (Release 15)", V15.2.1 (Jun. 2018).

3GPP TS 37.340, "3rd Generation Partnership Project; Technical Specification Group Radio Access Network; Evolved Universal Terrestrial Radio Access (E-UTRA) and NR; Multi-connectivity; Stage 2 (Release 15)", V15.2.0 (Jun. 2018).

3rd Generation Partnership Project; Technical Specification Group Radio Access Network; NR; Radio Resource Control (RRC); Protocol specification, 3GPP TS 38.331 version 17.5.0 Release 17(Jun. 2023).

ETSI, Universal Mobile Telecommunication System(UMTS); LTE; 5G; IP Multimedia Subsystem(IMS); Multimedia telephony; Media handling and interaction; 3GPP TS 26.114 version 17.8.0 Release 17(Jul. 2023).

3rd Generation Partnership Project; Technical Specification Group Radio Access Network; NR; User Equipment (UE) feature list(Release 17), 3GPP TR 38.822 V17.1.0 (Jun. 2023).

\* cited by examiner

```
<OMITTED>
UE-CapabilityRAT-ContainerList ::=    SEQUENCE (SIZE (0..maxRAT-Capabilities)) OF UE-CapabilityRAT-Container
    <PARTLY OMITTED>
UE-CapabilityRAT-Container ::=    SEQUENCE {
    rat-Type                              RAT-Type,
    ueCapabilityRAT-Container             OCTET STRING
}
    <PARTLY OMITTED>
UE-EUTRA-Capability ::=    SEQUENCE {
    <PARTLY OMITTED>
    mmtel-Parameters                      MMTEL-Parameters,
    <PARTLY OMITTED>
}
    <PARTLY OMITTED>
MMTEL-Parameters ::=    SEQUENCE {
    <PARTLY OMITTED>
    packetLossRateReporting               ENUMERATED {supported},
    <PARTLY OMITTED>
}
<OMITTED>
```

FIG. 9

```
<OMITTED>
RRCConnectionReconfiguration-IEs ::=   SEQUENCE {
    otherConfig                         OtherConfig,
    <PARTLY OMITTED>
}
<PARTLY OMITTED>
OtherConfig ::=   SEQUENCE {
    <PARTLY OMITTED>
    [[ packetLossRateReportingConfig   CHOICE{
            release                                NULL,
            setup                                  SEQUENCE{
                packetLossRateProhibitTimer        ENUMERATED {s0, s0dot4, s1dot6, s3]
            }
        }
    ]]
}
<OMITTED>
```

FIG. 10

```
<OMITTED>
PacketLossRateReport ::=   SEQUENCE {
    dl-packetLossRate          ENUMERATED {plr1, plr2, plr2dot7, plr4dot5}   DEFAULT plr1
    ul-packetLossRate          ENUMERATED {plr1, plr2, plr2dot7, plr4dot5}   DEFAULT plr1
<OMITTED>
}
```

FIG. 12

| Index | PLR (percent) |
|---|---|
| 0 | 1 |
| 1 | 2 |
| 2 | 2.7 |
| 3 | 4.5 |
| 4 | 6.3 |

FIG. 14

```
<OMITTED>
RRCConnectionReconfiguration-IEs ::=   SEQUENCE {
    <PARTLY OMITTED>
    otherConfig              OtherConfig.
    <PARTLY OMITTED>
}
OtherConfig ::=  SEQUENCE {
    <PARTLY OMITTED>
    [[  packetLossRateReportingConfig    CHOICE{
            release                           NULL,
            setup                             SEQUENCE{
                packetLossRatePeriodicTimer   ENUMERATED {s0, s0dot4, s1dot6, s3}
            }
    ]]
<OMITTED>
    :
}
```

FIG. 15

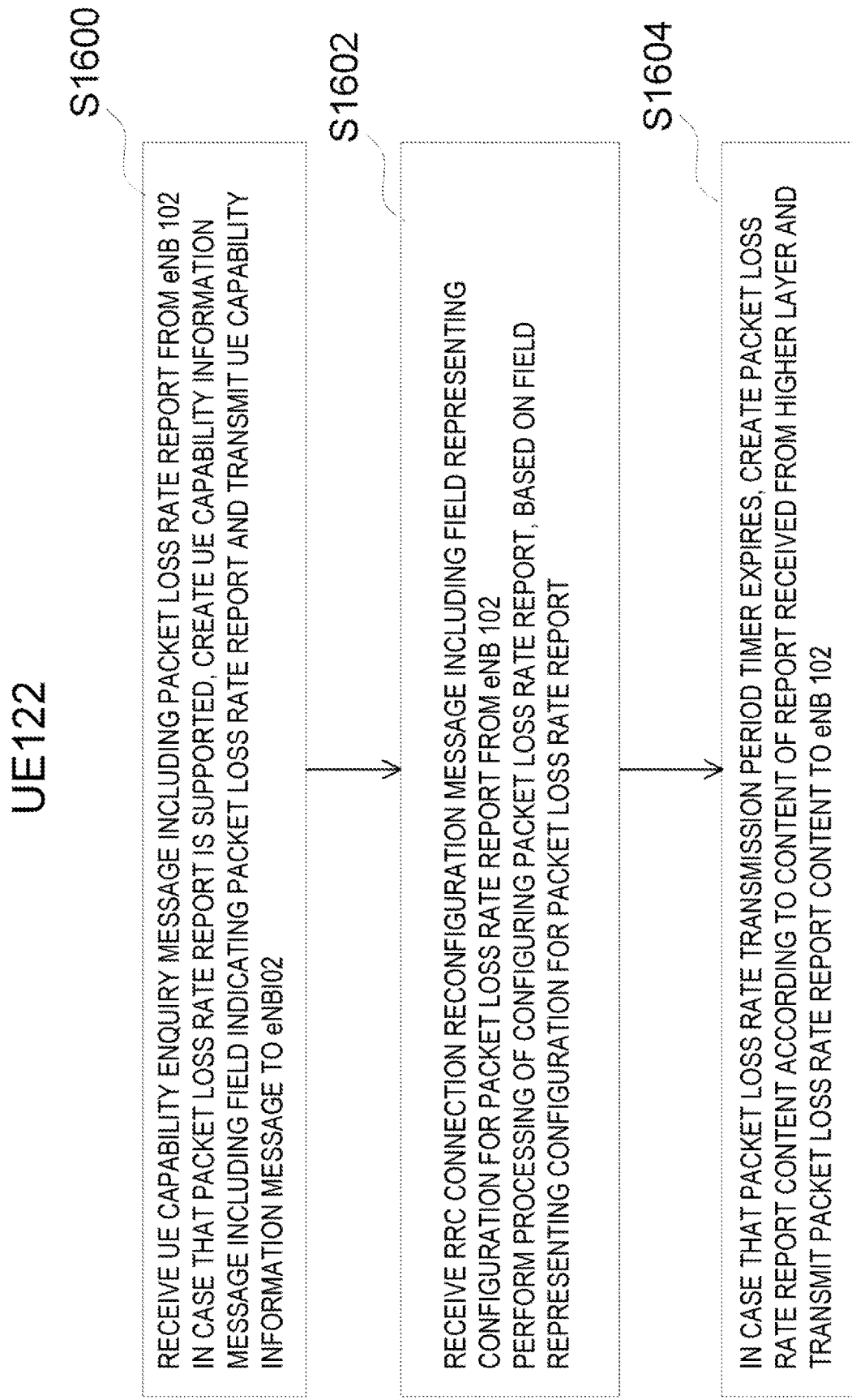

TERMINAL APPARATUS, BASE STATION APPARATUS, AND METHOD

TECHNICAL FIELD

The present invention relates to a terminal apparatus, a base station apparatus, and a method. This application claims priority based on Japanese Patent Application No. 2018-148466 filed in Japan on Aug. 7, 2018, the contents of which are incorporated herein by reference.

BACKGROUND ART

A radio access method and a radio network for cellular mobile communications (which will hereinafter be referred to as "Long Term Evolution (LTE; trade name)" or "Evolved Universal Terrestrial Radio Access (E-UTRA)") and a core network (which will be referred to as "Evolved Packet Core or EPC") have been studied by the 3rd Generation Partnership Project (3GPP).

Furthermore, as a radio access method and a radio network technology for a 5th generation cellular system, technical studies and standardization of LTE-Advanced Pro which is an enhanced technology of LTE and New Radio technology (NR) which is a new radio access technology have been conducted by the 3GPP (NPL 1). Furthermore, 5 Generation Core Network (5GC), which is a core network for the 5th generation cellular system, has also been studied (NPL 2).

Further, in 3GPP, Voice over IP (VoIP) that uses the IP Multimedia Subsystem (IMS) (NPL 17) for performing call control of a service in E-UTRA, EPC, and 3GPP or the like has been standardized. The VoIP has been standardized in 3GPP so that its service can be provided in an environment using NR for a radio network and an environment using 5GC for a core network as well.

CITATION LIST

Non Patent Literature

NPL 1: 3GPP RP-170855, "Work Item on New Radio (NR) Access Technology"
NPL 2: 3GPP TS 23.501 v15.2.0, "System Architecture for the 5G System; Stage 2"
NPL 3: 3GPP TS 36.300 v15.2.0, "Evolved Universal Terrestrial Radio Access (E-UTRA) and Evolved Universal Terestrial Radio Access Network (E-UTRAN); Overall description; Stage 2"
NPL 4: 3GPP TS 36.331 v15.2.1, "Evolved Universal Terrestrial Radio Access (E-UTRA); Radio Resource Control (RRC); Protocol specifications"
NPL 5: 3GPP TS 36.323 v15.0.0, "Evolved Universal Terrestrial Radio Access (E-UTRA); Packet Data Convergence Protocol (PDCP) specification"
NPL 6: 3GPP TS 36.322 v15.1.0, "Evolved Universal Terrestrial Radio Access (E-UTRA); Radio Link Control (RLC) protocol specification"
NPL 7: 3GPP TS 36.321 v15.2.0, "Evolved Universal Terrestrial Radio Access (E-UTRA); Medium Access Control (MAC) protocol specification"
NPL 8: 3GPP TS 37.340 v15.2.0, "Evolved Universal Terrestrial Radio Access (E-UTRA) and NR; Multi-Connectivity; Stage 2"
NPL 9: 3GPP TS 38.300 v15.2.0, "NR; NR and NG-RAN Overall description; Stage 2"
NPL 10: 3GPP TS 38.331 v15.2.1, "NR; Radio Resource Control (RRC); Protocol specifications"
NPL 11: 3GPP TS 38.323 v15.2.0, "NR; Packet Data Convergence Protocol (PDCP) specification"
NPL 12: 3GPP TS 38.322 v15.2.0, "NR; Radio Link Control (RLC) protocol specification"
NPL 13: 3GPP TS 38.321 v15.2.0, "NR; Medium Access Control (MAC) protocol specification"
NPL 14: 3GPP TS 23.401 v14.3.0, "General Packet Radio Service (GPRS) enhancements for Evolved Universal Terrestrial Radio Access Network (E-UTRAN) access"
NPL 15: 3GPP TS 23.502 v15.2.0, "Procedure for 5G System; Stage 2"
NPL 16: 3GPP TS 37.324 v15.0.0, "NR; Service Data Adaptation Protocol (SDAP) specification"
NPL 17: 3GPP TS 23.228 v15.2.0, "IP Multimedia Subsystem (IMS); Stage 2"
NPL 18: 3GPP TS 23.216 v15.2.0, "Single Radio Voice Call Continuity (SRVCC); Stage 2"
NPL 19: 3GPP TR 26.959 v15.0.0, "Study on enhanced Voice over LTE (VoLTE) performance"
NPL 20: 3GPP TS 23.203 v15.3.0, "Policy and charging control architecture"

SUMMARY OF INVENTION

Technical Problem

In VoIP of 3GPP, in a case that a terminal is about to leave a VoIP service area during a voice phone call (hereinafter referred to as a VoIP phone call) by means of VoIP, there exists a technology referred to as Single Radio Voice Communication Continuity (SRVCC), in which the phone call is handed over to a different radio access network such as a GSM (trade name) EDGE Radio Access Network (GERAN) and a Universal Terrestrial Radio Access Network (UTRAN) so that the phone call is switched to a phone call using a conventional line switching scheme (NPL 18). A base station determines the SRVCC handover, based on a radio quality state of a radio access network in which the terminal is currently located, and gives a command of the SRVCC handover to the terminal.

However, in a case that a threshold of the SRVCC handover is determined based only on a radio state in which the terminal is, without consideration of a codec used in the VoIP phone call, robustness characteristics of the codec regarding packet loss, and the like, the SRVCC handover may be commanded even in a case that there is no need for the SRVCC handover from the viewpoint of phone call quality of VoIP, and the phone call may be switched to a phone call in a line switching network having phone call quality lower than the phone call quality of the VoIP phone call. This has hitherto been posing a problem that phone call quality may be deteriorated contrary to expectations.

NPL 19 discusses and discloses a method of updating a parameter such as a packet loss rate held by the base station by transmitting, from the terminal to the base station, a parameter related to robustness such as a Maximum Packet Loss Rate, based on information such as a codec negotiated for a VoIP phone call session and a configuration of the codec. However, NPL 19 does not disclose how specifically the parameter is reported to the base station.

One aspect of the present invention is made in the light of the circumstances as described above, and has an object to provide a terminal apparatus, a base station apparatus, a method used for the terminal apparatus, and an integrated circuit implemented on the terminal apparatus that are capable of reducing complexity of protocol processing, reducing deterioration of phone call quality, and efficiently performing communication.

Solution to Problem

In order to accomplish the object described above, one aspect of the present invention is contrived to provide the following means. Specifically, a terminal apparatus for communicating with a base station apparatus includes: a reception unit configured to receive a radio resource control (RRC) message from the base station apparatus; and a processing unit configured to configure a packet loss prohibit timer according to a packet loss rate report prohibit timer field included in the RRC message, and based on reception of a report of a packet loss rate from a higher layer and a fact that a packet loss rate report prohibit timer is not running, create a packet loss rate report content according to a content of the report of the packet loss rate received from the higher layer, start the packet loss rate report prohibit timer, and transmit the packet loss rate report content to the base station apparatus. The packet loss rate report content includes information of a direction for indicating whether the direction is an uplink direction or a downlink direction, and information of the packet loss rate.

One aspect of the present invention includes: a reception unit configured to receive a radio resource control (RRC) message from a base station apparatus; and a processing unit configured to configure a packet loss rate report periodic timer according to a packet loss rate report periodic timer field included in the RRC message, and based on expiration of the packet loss rate report periodic timer, create a packet loss rate report content according to a content of a report of a packet loss rate received from a higher layer, and transmit the packet loss rate report content to the base station apparatus. The packet loss rate report content includes information of a direction for indicating whether the direction is an uplink direction or a downlink direction, and information of the packet loss rate.

One aspect of the present invention is a base station apparatus for communicating with a terminal apparatus, the base station apparatus including: a transmission unit configured to transmit a radio resource control (RRC) message to the terminal apparatus; and a processing unit configured to cause the terminal apparatus to perform processing by including a packet loss rate report prohibit timer field in the RRC message. The processing is processing of, based on reception of a report of a packet loss rate from a higher layer and a fact that a packet loss rate report prohibit timer is not running, creating a packet loss rate report content according to a content of the report of the packet loss rate received from the higher layer, starting the packet loss rate report prohibit timer, and transmitting the packet loss rate report content to the base station apparatus. The packet loss rate report content includes information of a direction for indicating whether the direction is an uplink direction or a downlink direction, and information of the packet loss rate.

One aspect of the present invention is a base station apparatus for communicating with a terminal apparatus, the base station apparatus including: a transmission unit configured to transmit a radio resource control (RRC) message to the terminal apparatus; and a processing unit configured to cause the terminal apparatus to perform processing by including a packet loss rate report periodic timer field in the RRC message. The processing is, based on expiration of the packet loss rate report periodic timer, creating a packet loss rate report content according to a content of a report of a packet loss rate received from a higher layer, and transmitting the packet loss rate report content to the base station apparatus. The packet loss rate report content includes information of a direction for indicating whether the direction is an uplink direction or a downlink direction, and information of the packet loss rate.

One aspect of the present invention is a method for a terminal apparatus for communicating with a base station apparatus, the method including the steps of: receiving a radio resource control (RRC) message from the base station apparatus; configuring a packet loss prohibit timer according to a packet loss rate report prohibit timer field included in the RRC message; and based on reception of a report of a packet loss rate from a higher layer and a fact that a packet loss rate report prohibit timer is not running, creating a packet loss rate report content according to a content of the report of the packet loss rate received from the higher layer, starting the packet loss rate report prohibit timer, and transmitting the packet loss rate report content to the base station apparatus. The packet loss rate report content includes information of a direction for indicating whether the direction is an uplink direction or a downlink direction, and information of the packet loss rate.

One aspect of the present invention is a method for a terminal apparatus for communicating with a base station apparatus, the method including the steps of: receiving a radio resource control (RRC) message from the base station apparatus; configuring a packet loss rate report periodic timer according to a packet loss rate report periodic timer field included in the RRC message; and based on expiration of the packet loss rate report periodic timer, creating a packet loss rate report content according to a content of a report of a packet loss rate received from a higher layer, and transmitting the packet loss rate report content to the base station apparatus. The packet loss rate report content includes information of a direction for indicating whether the direction is an uplink direction or a downlink direction, and information of the packet loss rate.

One aspect of the present invention is a method for a base station apparatus for communicating with a terminal apparatus, the method including the steps of: transmitting a radio resource control (RRC) message to the terminal apparatus; and including a packet loss rate report prohibit timer field in the RRC message and causing the terminal apparatus to perform processing. The processing is processing of, based on reception of a report of a packet loss rate from a higher layer and a fact that a packet loss rate report prohibit timer is not running, creating a packet loss rate report content according to a content of the report of the packet loss rate received from the higher layer, starting the packet loss rate report prohibit timer, and transmitting the packet loss rate report content to the base station apparatus. The packet loss rate report content includes information of a direction for indicating whether the direction is an uplink direction or a downlink direction, and information of the packet loss rate.

One aspect of the present invention is a method for a base station apparatus for communicating with a terminal apparatus, the method including the steps of: transmitting a radio resource control (RRC) message to the terminal apparatus; and including a packet loss rate periodic timer field in the RRC message and causing the terminal apparatus to perform processing. The processing is, based on expiration of the packet loss rate report periodic timer, creating a packet loss rate report content according to a content of a report of a packet loss rate received from a higher layer, and transmitting the packet loss rate report content to the base station apparatus. The packet loss rate report content includes information of a direction for indicating whether the direction is an uplink direction or a downlink direction, and information of the packet loss rate.

Note that these comprehensive or specific aspects may be implemented in a system, an apparatus, a method, an integrated circuit, a computer program, or a recording medium, or may be implemented in any combination of systems, apparatuses, methods, integrated circuits, computer programs, and recording media.

Advantageous Effects of Invention

According to one aspect of the present invention, the terminal apparatus can reduce complexity of protocol processing, reduce deterioration of phone call quality, and efficiently perform communication.

BRIEF DESCRIPTION OF DRAWINGS

FIG. 9 is an example of ASN.1 description representing information elements included in a UE capability information message of FIG. 6 according to each embodiment of the present invention.

FIG. 10 is an example of ASN.1 description representing information elements included in an RRC connection reconfiguration message of FIG. 6 according to Embodiment 1 of the present invention.

FIG. 12 is an example of a packet loss rate report information element being a packet loss rate report format of a case that transmission of a packet loss rate report content to the eNB is performed using an RRC message according to each embodiment of the present invention.

FIG. 14 is an example of a table of values for a packet loss rate according to each embodiment of the present invention.

FIG. 15 is an example of ASN.1 description representing information elements included in an RRC connection reconfiguration message of FIG. 6 according to Embodiment 2 of the present invention.

FIG. 16 is an example of a processing method of the UE 122 according to Embodiment 2 of the present invention.

DESCRIPTION OF EMBODIMENTS

Hereinafter, an embodiment of the present invention will be described in detail with reference to the drawings.

LTE (and LTE-A Pro) and NR may be defined as different Radio Access Technologies (RATs). The NR may be defined as a technology included in the LTE. The LTE may be defined as a technology included in the NR. In addition, the LTE that is connectable to the NR using Multi RAT Dual connectivity may be distinguished from the existing LTE. The present embodiment may be applied to the NR, the LTE and other RATs. Terms associated with the LTE and the NR are used in the following description. However, the present invention may be applied to other technologies using other terms. In the present embodiment, the term "E-UTRA" may be replaced with "LTE," and the term "LTE" may be replaced with "E-UTRA".

Figure 1:
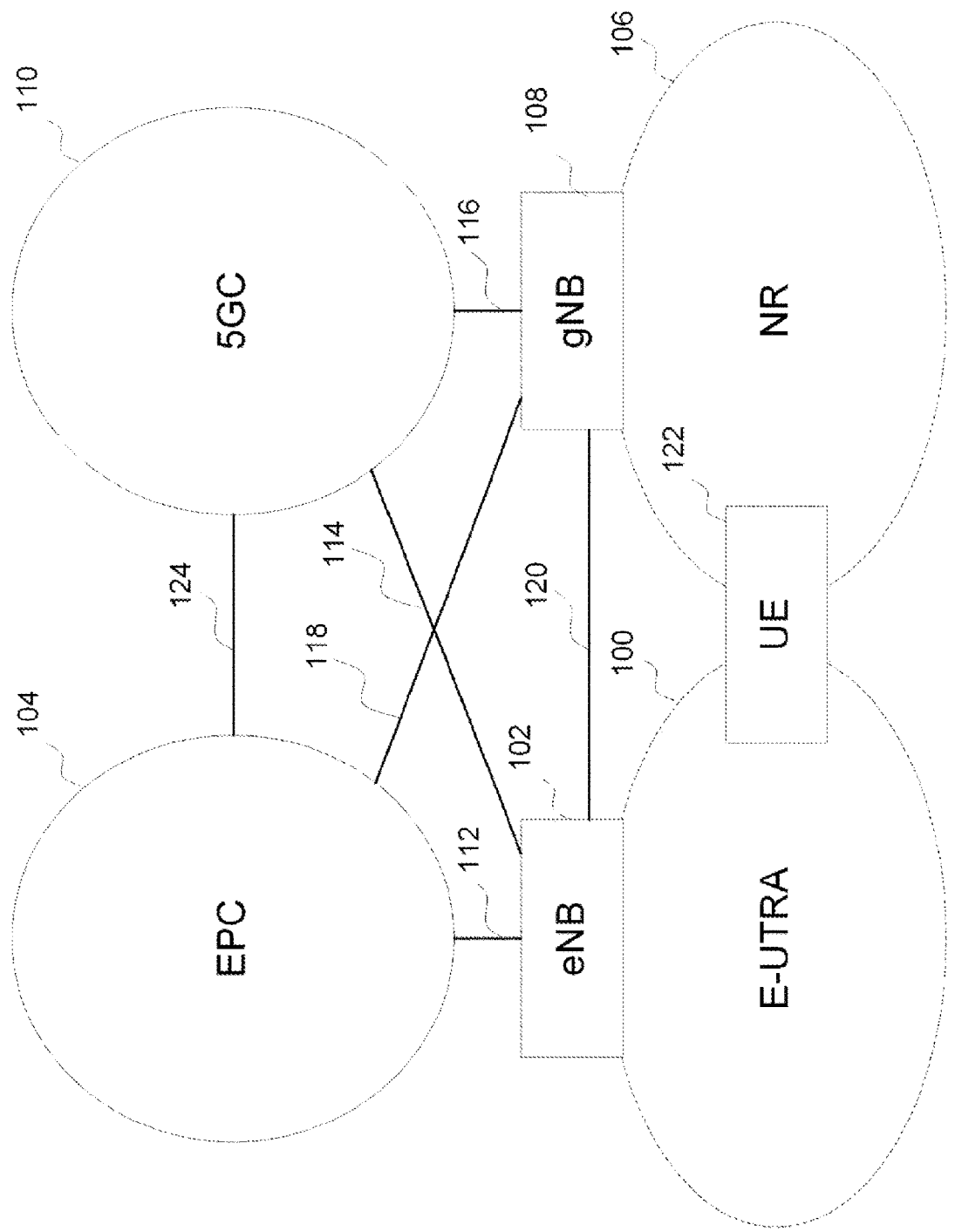
FIG. 1 is a schematic diagram of a communication system according to an embodiment of the present invention.

FIG. 1 is a schematic diagram of a communication system according to each embodiment of the present invention.

An E-UTRA 100 is a radio access technology described in NPL 3 or the like, and includes a Cell Group (CG) configured in one or multiple frequency bands. An E-UTRAN Node B (eNB) 102 is a base station apparatus of the E-UTRA. An Evolved Packet Core (EPC) 104 is a core network described in NPL 14 or the like and is designed as a core network for the E-UTRA. An interface 112 is an interface between the eNB 102 and the EPC 104, where there is a control plane (CP) through which control signals are transferred and a user plane (UP) through which user data is transferred.

An NR 106 is a radio access technology described in NPL 9 or the like, and includes a Cell Group (CG) configured in one or multiple frequency bands. A gNode B (gNB) 108 is an NR base station apparatus. A 5GC 110 is a core network described in NPL 2 or the like, and is designed as a core network for NR, but may be used as a core network of E-UTRA having a function of connecting to SCG. E-UTRA may hereinafter include E-UTRA having the function of connecting to SCG.

An interface 114 is an interface between the eNB 102 and the 5GC 110, an interface 116 is an interface between the gNB 108 and the 5GC 110, an interface 118 is an interface between the gNB 108 and the EPC 104, an interface 120 is an interface between the eNB 102 and the gNB 108, and an interface 124 is an interface between the EPC 104 and 5GC 110. The interface 114, the interface 116, the interface 118, the interface 120, and the interface 124 are interfaces that transfer CP only, UP only, or both the CP and the UP. Furthermore, the interface 114, the interface 116, the interface 118, the interface 120, and the interface 124 may not exist depending on communication systems provided by network operators.

A UE 122 is a terminal apparatus supporting the NR or both the E-UTRA and the NR.

Figure 2:
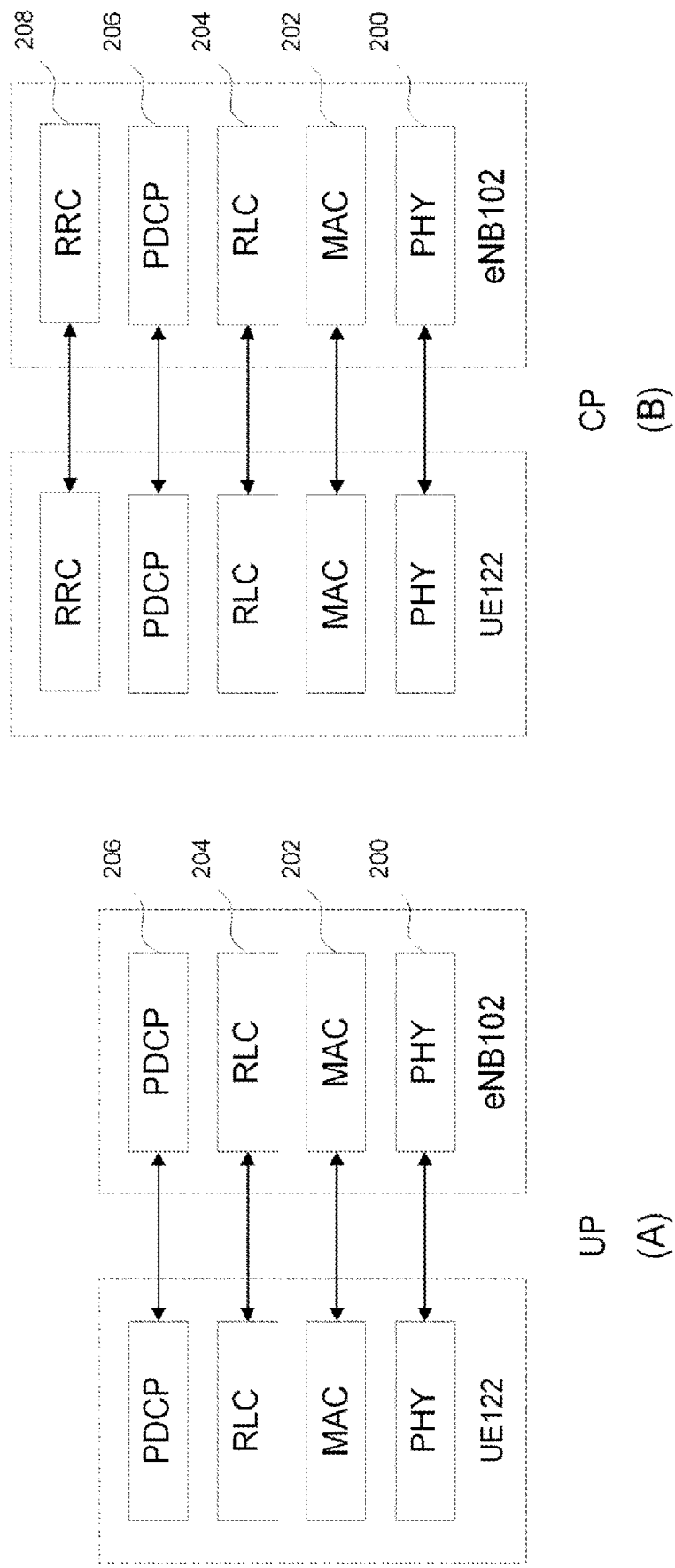
FIG. 2 is a diagram of protocol stacks of UP and CP of a terminal apparatus and a base station apparatus in E-UTRA according to an embodiment of the present invention.

FIG. 2 is a diagram of Protocol Stacks of UP and CP of a terminal apparatus and a base station apparatus in an E-UTRA radio access layer according to each embodiment of the present invention.

FIG. 2(A) is a diagram of the protocol stack of the UP used in a case that the UE 122 communicates with the eNB 102.

A Physical layer (PHY) 200 is a radio physical layer for providing a transmission service to a higher layer by using a Physical Channel. The PHY 200 is connected with a Medium Access Control layer (MAC) 202 of a higher layer to be described below via transport channels. Data is exchanged between the MAC 202 and the PHY 200 via the transport channels. The data is transmitted and/or received via radio physical channels between the PHYs of the UE 122 and the eNB 102.

The MAC 202 is a medium access control layer that performs mapping of various Logical Channels to various transport channels. The MAC 202 is connected with a Radio Link Control layer (RLC) 204 of a higher layer to be described below via logical channels. The major classifications of the logical channel depend on the type of information to be transmitted, specifically, the logical channels are classified into control channels for transmitting control information and traffic channels for transmitting user information. The MAC 202 has a function of controlling the PHY 200 in order to perform the Discontinuous Reception and Transmission (DRX and DTX), a function of performing a Random Access procedure, a function of reporting transmit power information, a function of performing HARQ control, and the like (NPL 7).

An RLC 204 is a radio link control layer that divides (Segmentation) the data received from a Packet Data Convergence Protocol Layer (PDCP) 206 of a higher layer to be described below, and adjusts the data size such that a lower layer can properly perform data transmission. Furthermore, the RLC 200 also has a function of ensuring Quality of Service (QoS) required for each piece of data. In other words, the RLC 204 has a function of data retransmission control or the like (NPL 6).

A PDCP 206 is a packet data convergence protocol layer for efficiently transmitting IP Packets being user data between radio sections. The PDCP 206 may have a header compression function of performing compression of unnecessary control information. Furthermore, the PDCP 206 may also have a data encryption function (NPL 5).

Note that data processed in the MAC 202, the RLC 204, and the PDCP 206 are referred to as a MAC Protocol Data Unit (PDU), an RLC PDU, and a PDCP PDU, respectively. In addition, data delivered from a higher layer to the MAC 202, the RLC 204, and the PDCP 206 or data delivered therefrom to a higher layer are respectively referred to as a MAC Service Data Unit (SDU), an RLC SDU, and a PDCP SDU.

FIG. 2(B) is a diagram of the protocol stack of the CP used in a case that the UE 122 communicates with the eNB 102.

In addition to the PHY 200, the MAC 202, the RLC 204, and the PDCP 206, there is a Radio Resource Control layer (RRC) 208 in the protocol stack of the CP. The RRC 208 is a radio link control layer that performs control of logical channels, transport channels, and physical channels by configuring and reconfiguring Radio Bearers (RBs) and the like. The RBs may be classified into a Signaling Radio Bearer (SRB) and a Data Radio Bearer (DRB), and the SRB may be used as a path for transmitting an RRC message which is control information. The DRB may be used as a path for transmitting the user data. Each RB may be configured in the RRCs 208 of the eNB 102 and the UE 122 (NPL 4).

The functional classification of the MAC 202, the RLC 204, the PDCP 206, and the RRC 208 described above is an example, and some or all of the respective functions may not be implemented. Some or all of the functions of each layer may be included in another layer.

Note that, an IP layer and a Transmission Control Protocol (TCP) layer, a User Datagram Protocol (UDP) layer, an application layer, and the like that are higher layers than the IP layer are higher layers than the PDCP layer (not illustrated). Further, the RRC layer and the non Access Stratum (NAS) layer are also higher layers than the SDAP layer (not illustrated). In other words, the PDCP layer is a lower layer than the RRC layer, the NAS layer, and the IP layer, and the Transmission Control Protocol (TCP) layer, the User Datagram Protocol (UDP) layer, and the application layer higher than the IP layer.

Figure 3:
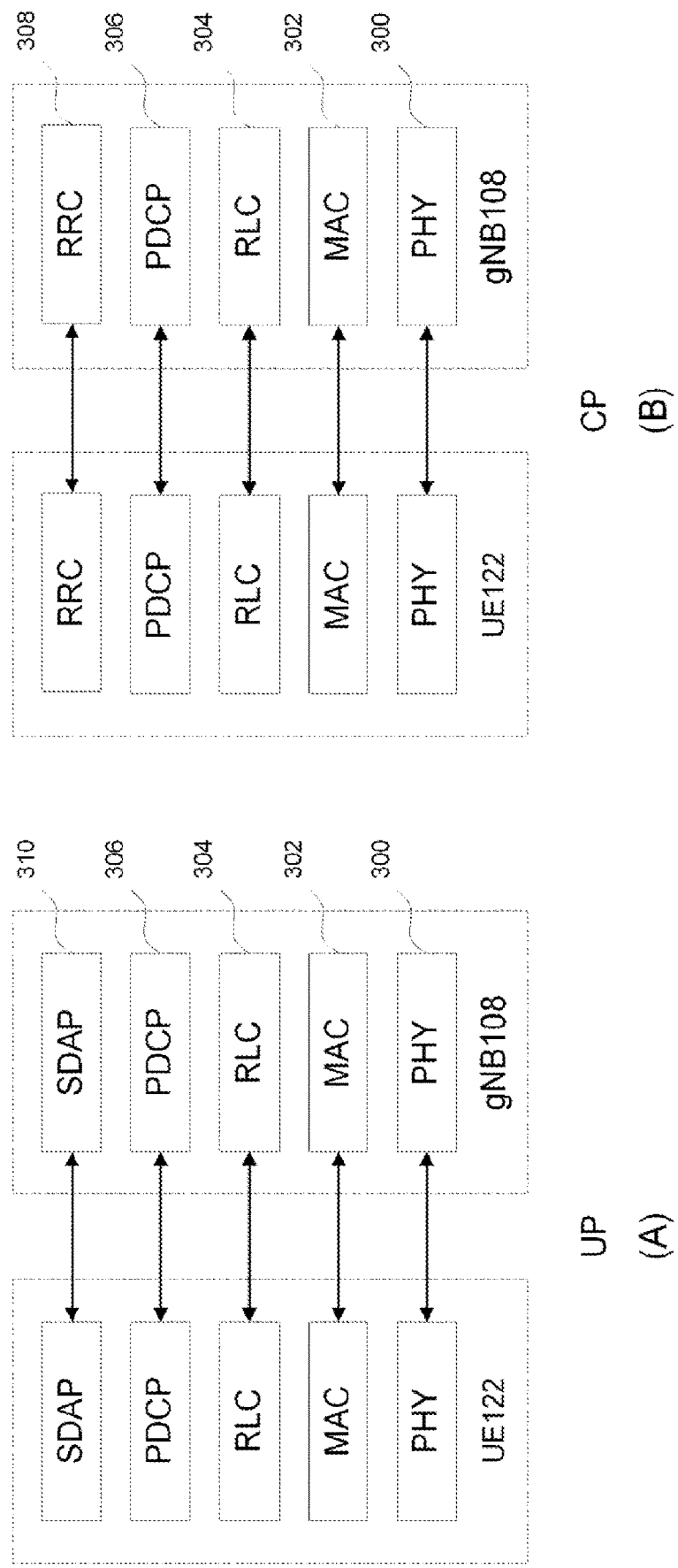
FIG. 3 is a diagram of protocol stacks of UP and CP of a terminal apparatus and a base station apparatus in NR according to an embodiment of the present invention.

FIG. 3 is a diagram of Protocol Stacks of UP and CP of a terminal apparatus and a base station apparatus in an NR radio access layer according to each embodiment of the present invention.

FIG. 3(A) is a diagram of the protocol stack of the UP used in a case that the UE 122 communicates with the gNB 108.

A Physical layer (PHY) 300 is a radio physical layer of the NR and may provide a transmission service to a higher layer by using the Physical Channel. The PHY 300 may be connected with the Medium Access Control layer (MAC) 302 of a higher layer to be described below via the transport channels. Data may be exchanged between the MAC 302 and the PHY 300 via the transport channels. The data may be transmitted and/or received between the PHYs of the UE 122 and the gNB 108 via the radio physical channel.

The MAC 302 is a medium access control layer that performs mapping of various Logical Channels to various transport channels. The MAC 302 may be connected with a Radio Link Control layer (RLC) 304 of is a high layer to be described below via the logical channels. The classification of the logical channel depends on the type of information to be transmitted, and the logical channels may be classified into the control channels for transmitting the control information and the traffic channels for transmitting the user information. The MAC 302 may have a function of controlling the PHY 300 in order to perform the Discontinuous Reception and Transmission (DRX and DTX), a function of performing the Random Access procedure, a function of reporting the transmit power information, a function of performing the HARQ control, and the like (NPL 13).

An RLC 304 is a radio link control layer that divides (Segmentation) the data received from a Packet Data Convergence Protocol Layer (PDCP) 206 of a higher layer to be described below, and adjusts the data size such that a lower layer can properly perform data transmission. Furthermore, the RLC 304 may also have a function of ensuring Quality of Service (QoS) required for each piece of data. In other words, the RLC 304 may have a function of data retransmission control or the like (NPL 12).

A PDCP 306 is a packet data convergence protocol layer of efficiently transmitting IP Packets being user data between radio sections. The PDCP 306 may have a header compression function of performing compression of unnecessary control information. Furthermore, the PDCP 306 may also have a data encryption function (NPL 11).

A Service Data Adaptation Protocol (SDAP) 310 is a service data adaptive protocol layer that has a function of associating (mapping) a QoS flow of a downlink transmitted from a core network to a terminal apparatus through a base station apparatus and a DRB, mapping a QoS flow of an uplink transmitted from the terminal apparatus to the core network through the base station apparatus and the DRB, and storing mapping rule information (NPL 16). In a case that the terminal apparatus receives the SDAP SDU from the higher layer together with QoS flow information, the terminal apparatus assigns the SDAP SDU to an appropriate DRB, based on the stored mapping rule between the QoS flow and the DRB. In a case that no mapping rules between the QoS flow and the DRB are stored, the terminal apparatus may assign the SDAP SDU to a default radio bearer (default DRB). The QoS flow includes one or multiple Service Data Flows (SDFs) processed using the same QoS policy (NPL 2). In addition, the SDAP may have a function of Reflective QoS of performing mapping of the QoS flow of the uplink and the DRB, based on information of the QoS flow of the downlink. Further, in a case that the association rule between the QoS flow and the DRB is changed, sequential delivery (in-sequence delivery) of the SDAP SDU may be ensured by creating an End Marker PDU and transmitting the End Marker PDU to the DRB before the change (NPL 2, NPL 16).

The end marker PDU is used for the an SDAP entity of the UE to report ending of association (mapping) between the QoS flow corresponding to a QoS flow identifier included in a QoS flow identifier field of the end marker PDU and the radio bearer in which the end marker PDU is transmitted, in an SDAP control PDU described in NPL 16.

Note that the IP layer and the Transmission Control Protocol (TCP) layer, the User Datagram Protocol (UDP) layer, the application layer, and the like that are higher layers than the IP layer are higher layers than the SDAP layer (not illustrated). Further, the RRC layer and the non Access Strarum (NAS) layer are also higher layers than the SDAP layer (not illustrated). In the NAS layer, association between the service data flow and the QoS flow is performed. In other words, the SDAP layer is a lower layer than the RRC layer, the NAS layer, and the IP layer, and the Transmission Control Protocol (TCP) layer, the User Datagram Protocol (UDP) layer, and the application layer higher than the IP layer.

Note that the data processed in the MAC 302, the RLC 304, the PDCP 306, and the SDAP 310 may be referred to as a MAC Protocol Data Unit (PDU), an RLC PDU, a PDCP PDU, and an SDAP PDU, respectively. In addition, the data delivered from higher layers to the MAC 202, the RLC 204, and the PDCP 206 or data delivered to higher layers therefrom may be respectively referred to as a MAC Service Data Unit (SDU), an RLC SDU, a PDCP SDU, and an SDAP SDU.

FIG. 3(B) is a diagram of the protocol stack of the CP used in a case that the UE 122 communicates with the gNB 108.

In addition to the PHY 300, the MAC 302, the RLC 304, and the PDCP 306, there is a Radio Resource Control layer (RRC) 308 in the protocol stack of the CP. The RRC 308 is a radio link control layer that performs control of logical channels, transport channels, and physical channels by configuring and reconfiguring Radio Bearers (RBs) and the like. The RBs may be classified into a Signaling Radio Bearer (SRB) and a Data Radio Bearer (DRB), and the SRB may be used as a path for transmitting an RRC message which is control information. The DRB may be used as a path for transmitting the user data. Each RB may be configured between RRCs 308 of the gNB 108 and the UE 122. Further, a part including the RLC 304 and the MAC 302 of the RB may be referred to as an RLC bearer (NPL 10).

The functional classification of the MAC 302, the RLC 304, the PDCP 306, the SDAP 310, and the RRC 308 described above is an example, and some or all of the functions may not be implemented. Some or all of the functions of each layer may be included in another layer.

Note that, hereinafter, in each embodiment of the present invention, in order to distinguish an E-UTRA protocol and an NR protocol from each other, the MAC 202, the RLC 204, the PDCP 206, and the RRC 208 may be respectively referred to as a MAC for E-UTRA or a MAC for LTE, an RLC for E-UTRA or an RLC for LTE, a PDCP for E-UTRA or a PDCP for LTE, and an RRC for E-UTRA or an RRC for LTE. Furthermore, the MAC 302, the RLC 304, the PDCP 306, and the RRC 308 may also be referred to as MAC for NR, RLC for NR, RLC for NR, and RRC for NR, respectively. Alternatively, there may be descriptions using a space such as an E-UTRA PDCP or an LTE PDCP, an NR PDCP, and the like.

As also illustrated in FIG. 1, the eNB 102, the gNB 108, the EPC 104, and the 5GC 110 may be connected to one another via the interface 112, the interface 116, the interface 118, the interface 120, and the interface 114. Thus, the RRC 208 in FIG. 2 may be replaced with the RRC 308 in FIG. 3 to support various communication systems. Furthermore, the PDCP 206 in FIG. 2 may also be replaced with the PDCP 306 in FIG. 3. Furthermore, the RRC 308 in FIG. 3 may include the function of the RRC 208 in FIG. 2. Furthermore, the PDCP 306 in FIG. 3 may be the PDCP 206 in FIG. 2.

Figure 4:
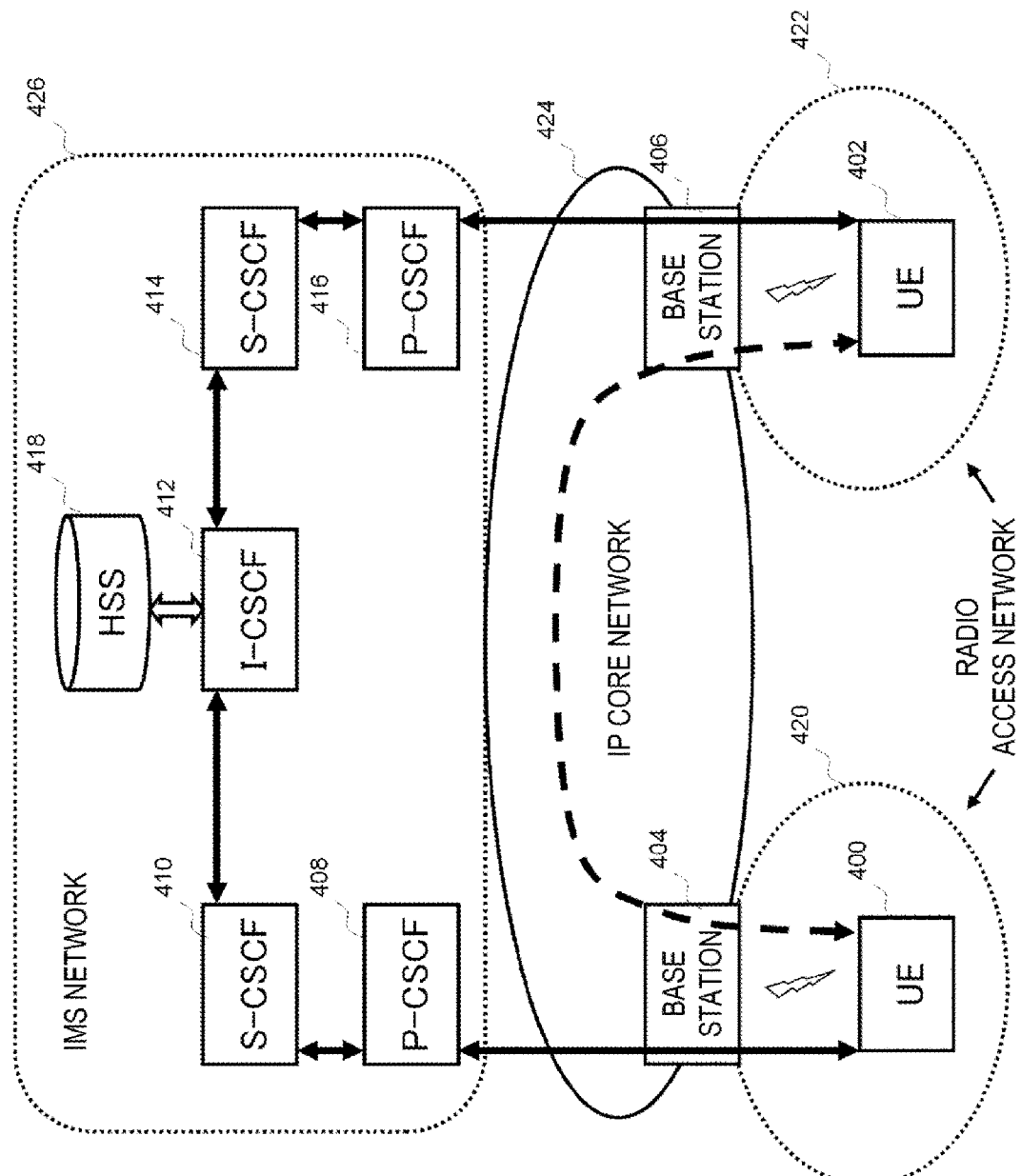
FIG. 4 is an example of a network configuration of VoIP of 3GPP.

FIG. 4 illustrates an example of a network configuration of VoIP of 3GPP. The network illustrated in FIG. 4 includes an IMS network 426, an IP core network 424 of an operator, base stations 404 and 406, and radio access networks 420 and 422 that are configured under the respective base stations. In FIG. 4, terminals (User Equipments (UEs)) 400 and 402 are respectively connected to the base stations 404 and 406 via radio in the radio access networks 420 and 422, and are connected to the IP core network 424 via the base stations 404 and 406.

Note that each of the base stations 404 and 406 may be the eNB 102, or may be the gNB 108. Further, the IP core network 424 may be the EPC 104, or may be the 5GC 110. Further, each of the UEs 400 and 402 may be the UE 122. Each of the radio access networks 420 and 422 may be the E-UTRA 100, or may be the NR 106.

The IMS network is a network for performing information management for call control, routing of a signaling message (Session Initiation Protocol (SIP)) of call control, and mutual connection with a legacy network of 3GPP or with a network of other than 3GPP.

In the IMS network 426 illustrated in FIG. 4, Proxy Call Session Control Functions (P-CSCFs) 408 and 416 are CSCFs in contact with the UEs 400 and 402, respectively. In a case that the UE transmits an IMS signaling message (SIP REGISTOR message, SIP INVITE message, or the like), the UE searches for the P-CSCF to which the UE can be connected, and transmits the IMS signaling message to the P-CSCF.

Serving CSCFs (S-CSCFs) 410 and 414 are CSCFs that perform management of contact information of the UE and management of a session. In a case that the S-CSCFs 410 and 414 perform management of the contact information of the UE, the S-CSCFs 410 and 414 download necessary information from a Home Subscriber Server (HSS) 418.

An Interrogating CSCF (I-CSCF) 412 stores information of the CSCFs between management domains (units of networks managed by each operator). In a case that the P-CSCF and the S-CSCF do not have next node information to which the IMS signaling message is to be transferred, for example, the IMS signaling message is transferred via the I-CSCF 412. Further, the I-CSCF 412 in some cases checks information of the CSCF being a transfer destination of the message, by enquiring of the HSS 418 about the information. For example, a case that the SIP INVITE message is transmitted will be described. In this case, the SIP INVITE message is first transmitted from a caller UE to the P-CSCF of the domain (caller domain) in which the UE is present, via the IP core network, and is transferred from the P-CSCF to the caller S-CSCF. After appropriate processing is performed in the caller S-CSCF, the SIP INVITE message is transferred to a receiver domain S-CFCS. In this case, the SIP INVITE message may be transferred via the I-CSCF 112. The receiver S-CSCF transfers the received SIP INVITE message to a receiver UE via the P-CSCF.

The IP core network 424 of the operator illustrated in FIG. 4 performs routing of communication data, control of the Quality of Service (QoS), management of position information of the terminal, and the like.

Figure 5:
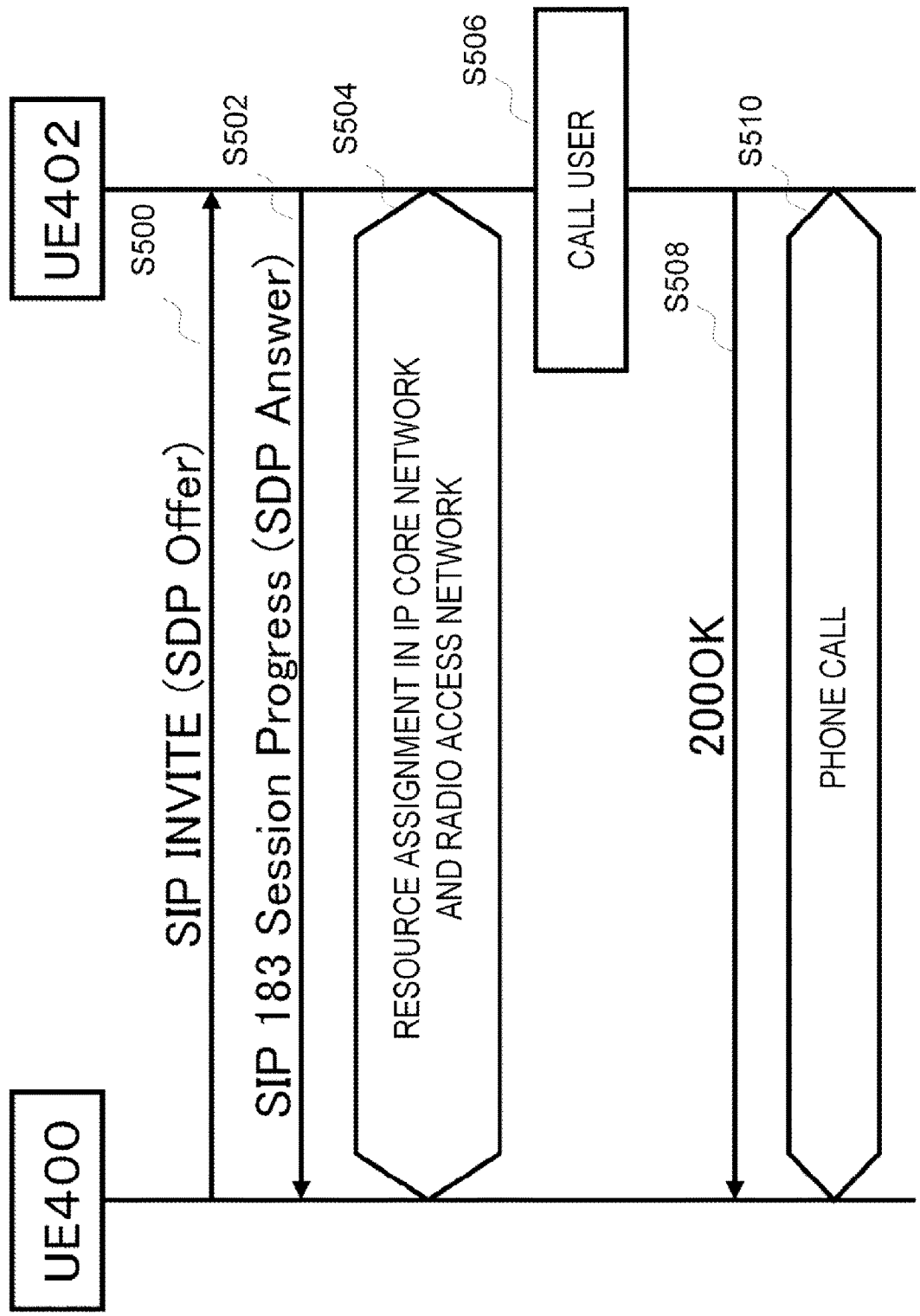
FIG. 5 is an example of a flow of a procedure until a VoIP phone call using the IMS of 3GPP is performed.

FIG. 5 is a flow illustrating an example of a procedure until a VoIP phone call using the IMS of 3GPP is performed. FIG. 5 illustrates a flow example of a case that the UE 400 places a phone call to the UE 402. As illustrated in FIG. 5, an SIP INVITE message is transmitted from the UE 400 to the UE 402 via the IMS network (Step S500), and an SIP 183. Session Progress message is transmitted from the UE 402 to the UE 400 via the IMS network (Step S502). In this manner, the SIP INVITE message and the SIP 183 Session Progress message are exchanged between the UEs, and negotiation related to the communication, for example, negotiation such as a codec to be used, a mode and a bit rate of the codec, and the like, is thereby performed.

In a Session Description Protocol (SDP) offer added to the SIP INVITE message, a mechanism used in the VoIP communication, for example, a scheme of a codec and a codec mode (a bit rate, a processing delay, and the like), candidates related to a protocol (a type of a Real-time Transport Protocol (RTP) payload format and the like), and the like are described. In a case that the UE 402 receives the SIP INVITE message in Step S500, the UE 402 selects one mechanism out of such multiple candidates described in the SDP offer, and describes the mechanism in an SDP answer. The UE 402 adds the SDP answer to the SIP 183 Session Progress message to transmit the SDP answer to the UE 400 in Step S502.

The mechanism selected in the UE 402 is analyzed in the IMS network, and a command of assigning resources according to the analysis results to this phone call session is given to the IP core network. In accordance with the command from the IMS network, resource assignment processing in the IP core network and the radio access network is performed (Step S504). After the resource assignment processing completes, calling to the user is performed in the UE 402 (Step S506), and in a case that the user responds, a 200 OK message is transmitted to the UE 400 (Step S508), and a phone call is started between the UE 400 and the UE 402 (Step S510).

Based on the description with reference to FIG. 4 and FIG. 5, it can be understood that the message of the IMS is not processed in the base station. In other words, the base station does not store the contents of the IMS message. Thus, in a case that the base station determines a threshold of SRVCC by taking robustness characteristics of the negotiated codec regarding the packet loss and the like into consideration, provision of information from the UE having the information of the negotiated codec, the mode and bit rate being used, and the like is necessary.

Note that the packet loss rate and/or permissible packet loss rate according to each embodiment of the present invention may refer to the maximum packet loss rate described in NPL 19, that is, the end-to-end maximum packet loss rate in the VoIP phone call. Further, the packet loss rate and/or the permissible packet loss rate according to each embodiment of the present invention may refer to the Packet Error Loss Rate (PELR) that occurs in a radio interface between the terminal and the base station, which is described in NPL 20. Further, the packet loss rate and/or the permissible packet loss rate according to each embodiment of the present invention may be expressed using another term such as robustness (rubustness).

EMBODIMENT 1

Embodiment 1 of the present invention will be described with reference to FIG. 1 to FIG. 14.

Figure 6:
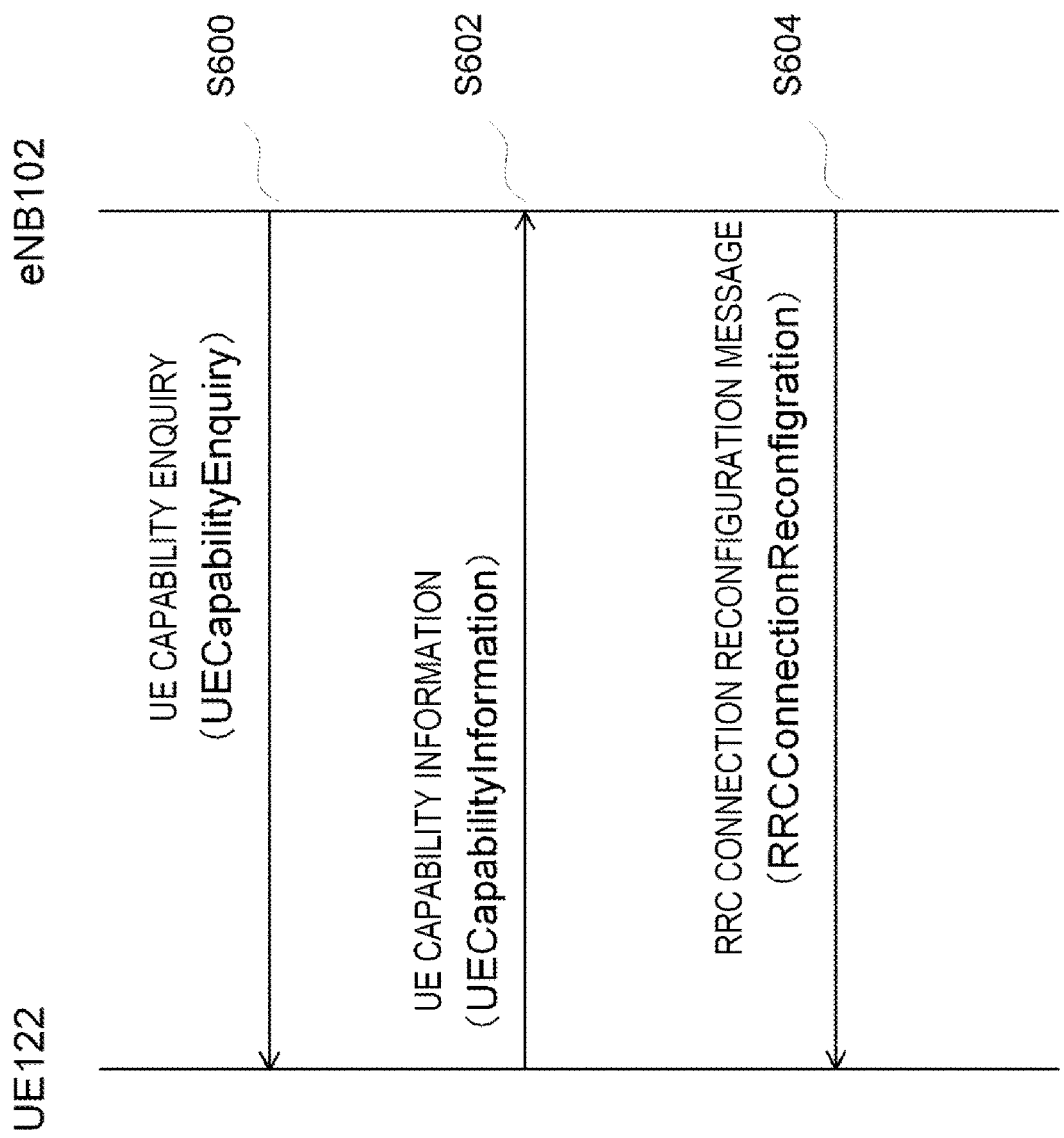
FIG. 6 is an example of a flow of a UE capability procedure and an RRC connection reconfiguration procedure according to each embodiment of the present invention.

FIG. 6 is a diagram illustrating an example of a flow of a UE capability procedure and an RRC connection reconfiguration procedure according to each embodiment of the present invention. Note that the RRC connection reconfiguration procedure may be an RRC reconfiguration procedure.

The UE capability procedure (UE capability transfer) is a means used to Transfer Radio access capability information of the UE 122 from the UE 122 to a network in LTE and/or NR.

The RRC connection reconfiguration procedure (RRC Connection Reconfiguration) is a procedure used for handover, Measurement, and the like in addition to establishment, change, and release of an RB, a change, a release, and the like of a secondary cell in LTE (E-UTRA) described in NPL 4. In contrast, the RRC reconfiguration procedure (RRC Connection Reconfiguration) is a procedure used for handover (reconfiguration involving synchronization), Measurement, and the like in addition to establishment, change, and release of an RB, a change, a release, and the like of a secondary cell in NR described in NPL 10. Regarding the RRC connection reconfiguration procedure, in the MR-DC, particularly in a case of E-UTRA-NR Dual Connectivity (EN-DC) being the MR-DC of a case that the core network is the EPC 104 and a master node is the eNB 102 and NG-RAN E-UTRA-NR Dual Connectivity (NGEN-DC) being the MR-DC of a case that the core network is the 5GC 110 and a master node is the eNB 102 (also referred to as an enhanced eNB 102), and further a case that the enhanced eNB 102 uses the 5GC 110 as the core network, the RRC connection reconfiguration procedure is also used for a part of the handover, the Measurement, and the like in addition to a part of the establishment, the change, and the release of the RB, and the change, the release, and the like of the secondary cell in NR described in NPL 10 as well as LTE. In each embodiment of the present invention, in order to avoid complexity of description, description is given by using the term "RRC connection reconfiguration procedure", and description is given by using the eNB 102 as the base station apparatus.

In the UE capability procedure, the eNB 102 transmits, to the UE 122, a UE capability enquiry (UECapabilityEnquiry) message for enquiring of the UE 122 about the UE Capability (Step S600). Based on the UE capability enquiry received from the eNB 102, the UE 122 creates a UE capability information (UECapabilityInformaion) message, and transmits the UE capability information message to the eNB 102 (Step S602). Note that other terms may be used for the messages such as the UE capability enquiry message and the UE capability information message.

Next, in the RRC connection reconfiguration procedure, based on the UE capability information acquired in the UE capability procedure, the eNB 102 creates an RRC connection reconfiguration message (RRCConnectionReconfigration), and transmits the RRC connection reconfiguration message to the UE 122 (Step S604). The UE 122 performs processing of various configurations, for example, a configuration of a prohibit timer, a configuration of a transmission period timer, and the like, according to information elements to be described later included in the RRC connection reconfiguration message. After Step S604, the UE 122 may transmit an RRC connection reconfiguration complete message (RRCConnectionReconfigrationComplete) and the like to the eNB 102 (not illustrated). Note that the RRC reconfiguration message may be replaced with RRC reconfiguration, and the RRC reconfiguration complete message may be replaced with RRC reconfiguration complete.

Figure 7:
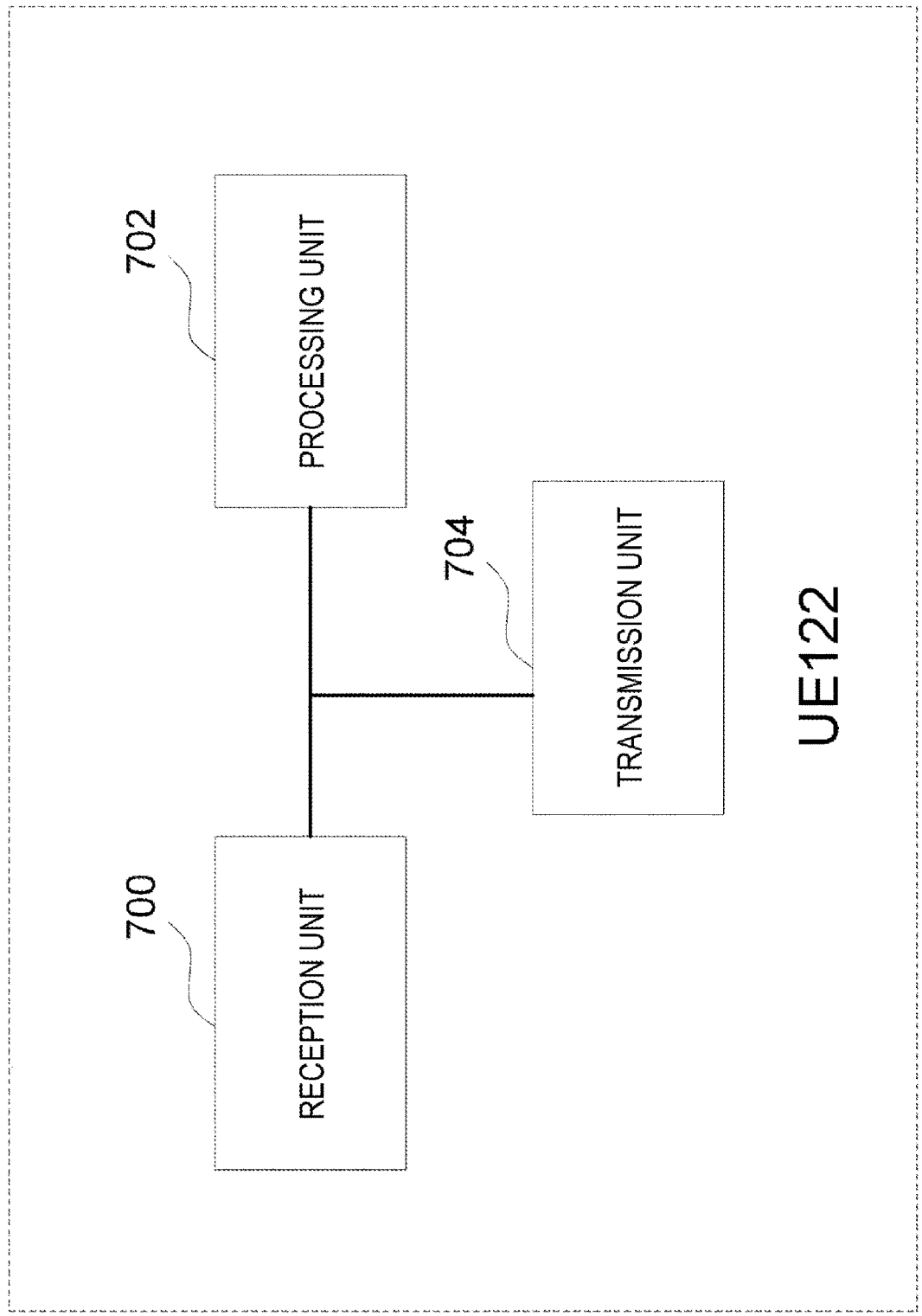
FIG. 7 is a block diagram illustrating a configuration of the terminal apparatus (UE 122) according to each embodiment of the present invention.

FIG. 7 is a block diagram illustrating a configuration of the terminal apparatus (UE 122) according to each embodiment of the present invention. Note that FIG. 7 illustrates only the main components closely related to the present invention in order to avoid complexity of description.

The UE 122 illustrated in FIG. 7 includes a reception unit 700 that receives, from the eNB 102, a message such as the UE capability enquiry message and the RRC connection reconfiguration message, the MAC Control Element (MAC CE), a report from the higher layer, and the like, a processing unit 702 that performs processing according to the various Information Elements (IEs) and various conditions such as a field included in the received message, the report from the higher layer, and the like, and a transmission unit 704 that transmits, to the eNB 102, a message such as the UE capability information message, the MAC Control Element (MAC CE), the report to the higher layer, and the like. A controller controlling operations of the units based on various conditions may be separately provided.

Figure 8:
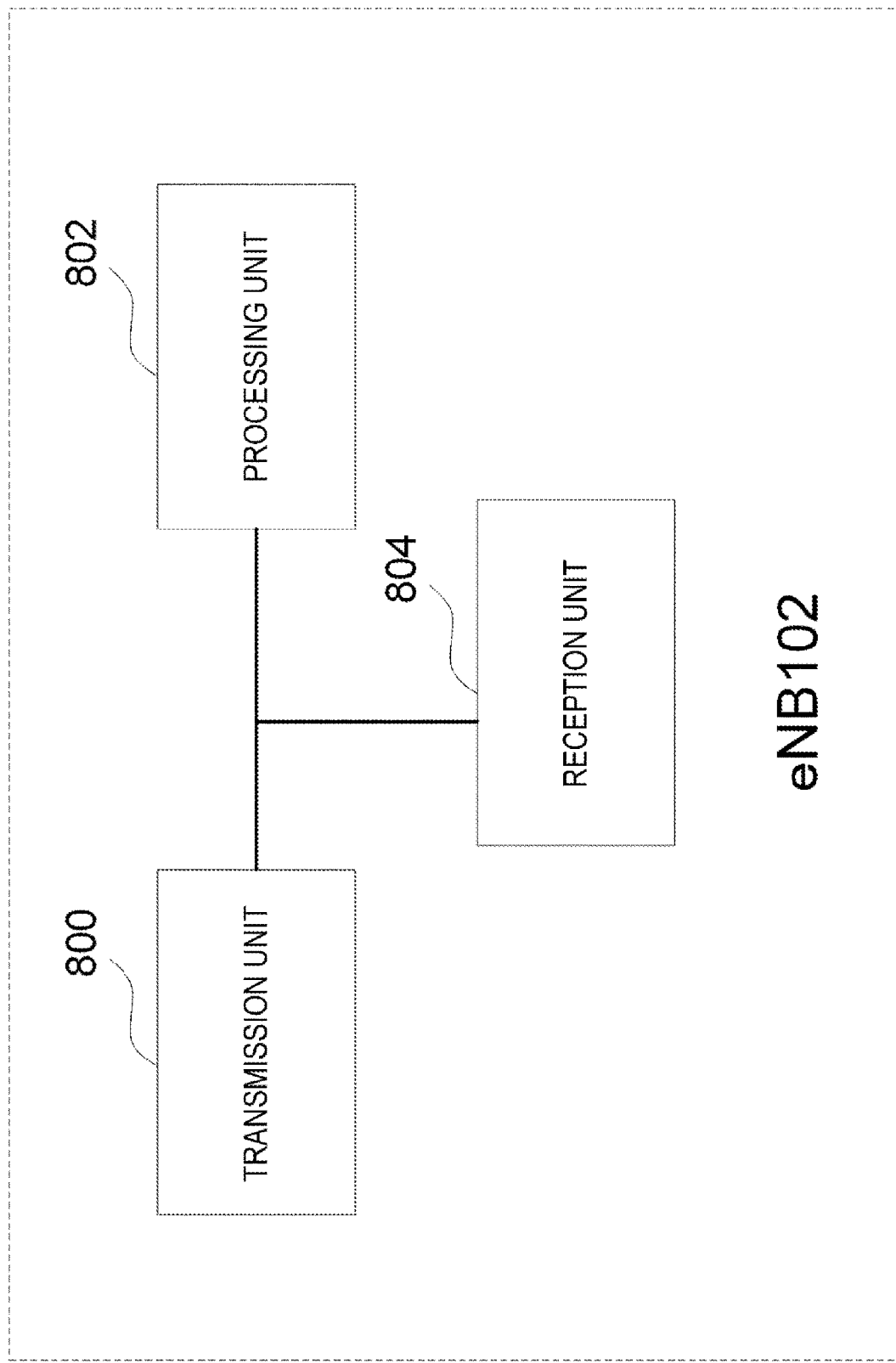
FIG. 8 is a block diagram illustrating a configuration of the base station apparatus (eNB 102) according to each embodiment of the present invention.

FIG. 8 is a block diagram illustrating a configuration of the base station apparatus (eNB 102) according to each embodiment of the present invention. Note that FIG. 8 illustrates only the main components closely related to the present invention in order to avoid complexity of description.

The eNB 102 illustrated in FIG. 8 includes a transmission unit 800 that transmits, to the UE 122, a message such as the UE capability enquiry message and the RRC connection reconfiguration message, the MAC Control Element (MAC CE), and the like, a processing unit 802 that causes the processing unit 702 of the UE 122 to perform processing by creating a message including various Information Elements (IEs), a field, and the like and transmitting the message to the UE 122, and a reception unit 804 that receives, from the UE 122, a message such as the UE capability information message, the MAC Control Element (MAC CE), and the like. Note that the configuration illustrated in FIG. 8 may be applied to the gNB 108. In a case that the configuration is applied to the gNB 108, the message transmitted from the transmission unit 800 to the UE 122 may be the RRC reconfiguration message. A controller controlling operations of the units based on various conditions may be separately provided.

Next, the information elements used in the UE capability procedure will be described.

FIG. 9 is an example of ASN.1 description representing the information elements included in the UE capability information message of FIG. 6 according to each embodiment of the present invention.

In 3GPP, in the specifications related to RRC (NPL 4, NPL 10), the messages, the Information Elements (IEs), and the like related to RRC are described using ASN.1. The message and/or the information element related to RRC includes one or multiple fields or Values of the fields. As the value of the field, other information elements in addition to an integer, a byte sequence, a list, and the like can be used. In a case that the value of each field of the message and/or the information element related to RRC is represented by the information element, in the embodiment of the present application, "field" may be described by being replaced by "information element". In the example of ASN.1 illustrated in FIG. 9, <omitted> and <partly omitted>are not part of the notation of ASN.1 and mean that other information is omitted. Note that there may also be omitted a field in a part where neither <omitted>nor <partly omitted> is indicated. Note that the example of ASN.1 illustrated in FIG. 9 does not correctly follow the ASN.1 notation method but represents notation of an example of parameters of the RRC reconfiguration according to the present invention, and other designations and other notations may be used. In addition, in order to avoid complexity of description, the example of ASN.1 illustrated in FIG. 9 represents only an example relating to main information that is closely related to the present invention. Note that the above description is also applied to other ASN.1 description according to the embodiment of the present application unless there is other explicit description.

In FIG. 9, the information element represented by UE-CapabilityRAT-ContainerList included in the capability information message has a list of containers represented by UE-CapabilityRAT-Container of the information elements as its Value, and the UE capability may be included in one container for each RAT. UE-CapabilityRAT-Container may include a rat-Type field having information indicating a Type of the Radio Access Technology (RAT) as its value, and a ueCapabilityRAT-Container field having a byte sequence indicating the UE capability of the RAT that is indicated by rat-Type as its value. In a case that the value of rat-Type of UE-CapabilityRAT-Container is associated with EUTRA, a UE-EUTRA-Capability information element may be included in the value of the ueCapabilityRAT-Container field. In addition, in a case that the value of rat-Type of UE-CapabilityRAT-Container is associated with NR, an information element for NR, for example, a UE-NR-Capability information element, may be included in the value of the ueCapabilityRAT-Container field.

An mmtel-Parameters field included in the UE-NR-Capability information element may have an MMTEL-Parameters information element as its value. The MMTEL-Parameters information element may include whether or not an auxiliary function for VoIP using the IMS of the UE 122, for example, a delay budget report, is supported, whether or not a recommended bit rate reception is supported, and the like.

In addition, as illustrated in FIG. 9, in the MMTEL-Parameters information element, a field (packetLossRateReporting) indicating whether or not the UE 122 supports a packet loss rate report may be included. In this case, in a case that a packetLossRateReporting field is not included in the MMTEL-Parameters information element, it may be indicated that the packet loss rate report is not supported. The packet loss rate report may refer to reporting of the permissible packet loss rate from the UE 122 to the eNB 102, based on a command and information from the higher layer.

Note that the inclusion of the packetLossRateReporting field in the MMTEL-Parameters information element is merely an example, and the packetLossRateReporting field may be included in another information element.

Next, the information elements used in the RRC connection reconfiguration procedure will be described.

FIG. 10 is an example of ASN.1 description representing the information elements included in the RRC connection reconfiguration message of FIG. 6 according to Embodiment 1 of the present invention.

In FIG. 10, the information element represented by RRC-ConnectionReconfiguration-IEs being the information element of the RRC connection reconfiguration may include the information element related to measurement, the information element related to radio resource configuration, and the like, as well as the information element represented by OtherConfig being the information element related to other configurations.

In the example of FIG. 10, in the information element represented by OtherConfig, a field represented by packetLossRateReportingConfig, which is a field representing a configuration for the above-described packet loss rate report, may be included. The field represented by packetLossRateReportingConfig may have a structure of selecting (CHOICE) a field represented by release that signifies release and a field represented by setup that signifies configuration. Further, the field represented by setup may include as a field (packet loss rate report prohibit timer field) represented by packetLossRateProhibitTimer, which is a field related to a configuration of a packet loss rate report prohibit timer being a timer for prohibiting the above-described packet loss rate report for a certain period of time, and the values of the field represented by packetLossRateProhibitTimer may be enumerated (ENUMERATED) as the value of the packet loss rate report prohibit timer.

Note that the inclusion of the field represented by packetLossRateProhibitTimer in the OtherConfig information element is merely an example, and the field represented by packetLossRateProhibitTimer may be included in, for example, another information element such as an information element indicating a configuration of a logical channel in MAC. In addition to the above, the information element indicating a configuration of a logical channel may include a field indicating priority of the logical channels, an identifier of a logical channel group, a field indicating association, or the like.

Figure 11:
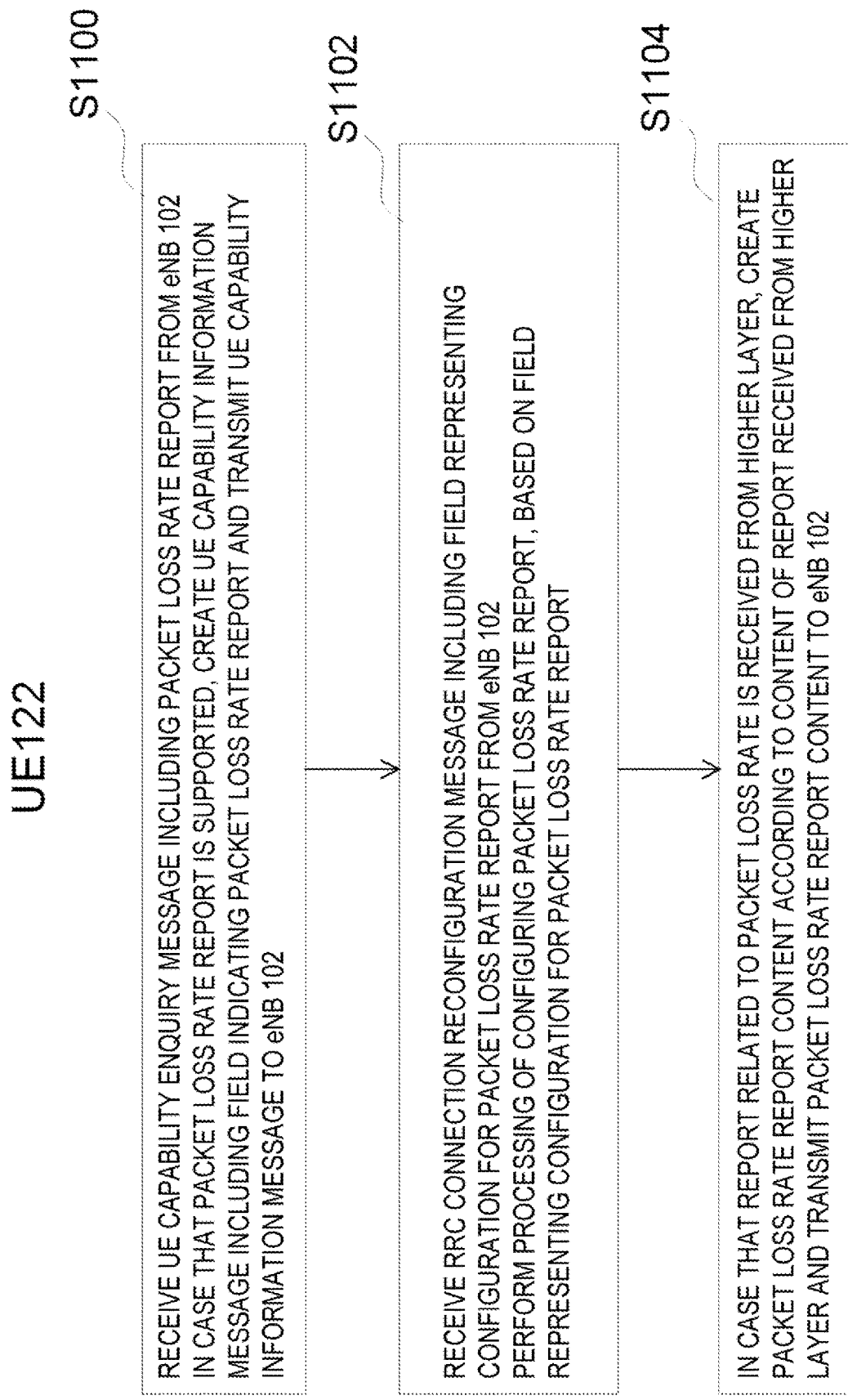
FIG. 11 is an example of a processing method of the UE 122 according to Embodiment 1 of the present invention.

An example of a processing method of the UE 122 according to Embodiment 1 of the present invention will be described with reference to FIG. 11.

The processing unit 802 of the eNB 102 creates the UE capability enquiry message including the field indicating the packet loss rate report and transmits the UE capability enquiry message to the UE 122 via the transmission unit 800 in order to cause the UE 122 to perform processing (not illustrated). The reception unit 700 of the UE 122 receives the UE capability enquiry message from the eNB 102. In a case that the processing unit 702 of the UE 122 supports the packet loss rate report, the processing unit 702 performs processing of creating the UE capability information message including the field indicating the packet loss rate report, and transmits the UE capability information message via the transmission unit 704 (Step S1100). The reception unit 804 of the eNB 102 receives the UE capability information message from the UE112 (not illustrated).

Next, the processing unit 802 of the eNB 102 creates the RRC connection reconfiguration message including a field representing a configuration for the packet loss rate report for causing the UE 122 to perform processing, and transmits the RRC connection reconfiguration message to the UE 122 via the transmission unit 800 (not illustrated). The reception unit 700 of the UE 122 receives the RRC connection reconfiguration message from the eNB 102. The processing unit 702 of the UE 122 may perform processing of configuring the packet loss rate report, based on the field representing the configuration for the packet loss rate report included in the RRC connection reconfiguration message received from the eNB 102 (Step 1102). The processing of configuring the packet loss rate report may be, for example, processing in which it is determined that transmission of the packet loss rate report is configured in a case that the field represented by packetLossRateReportingConfig indicates configuration (setup), it is determined that the packet loss rate report is not to be transmitted in a case that the field represented by packetLossRateReportingConfig indicates other than configuration (setup), for example, release, and the packet loss rate report prohibit timer is stopped in a case that the timer is in operation. Further, based on the determination that the above-described transmission of the packet loss rate report is configured, the fact that the packet loss rate report is to be performed may be reported to the higher layer.

In a case that the UE 122 receives a report related to the packet loss rate from the higher layer, the processing unit 702 of the UE 122 creates a packet loss rate report content according to the content of the report received from the higher layer, and transmits the packet loss rate report content to the eNB 102 (Step 1104). The above-described creation of the packet loss rate report content and transmission to the eNB 102 may be performed based on the determination that the transmission of the packet loss rate report in above Step S1102 is configured. Further, the above-described transmission to the eNB 102 or the above-described creation of the packet loss rate report content and transmission to the eNB 102 may be performed based on the fact that the packet loss rate report prohibit timer is not in operation.

In a case of the above-described creation of the packet loss rate report content or transmission to the eNB 102, the packet loss rate report prohibit timer may be started or restarted according to the value of the packet loss rate report prohibit timer.

Note that, in the above-described report related to the packet loss rate received from the higher layer, both the permissible packet loss rate in the uplink direction and the permissible packet loss rate in the downlink direction may be included, or either one of the permissible packet loss rate in the uplink direction and the permissible packet loss rate in the downlink direction may be included. Further, in the above-described report related to the packet loss rate received from the higher layer, other information may be included. Further, the higher layer may perform calculation, determination, or the like of the above-described permissible packet loss rate in the uplink direction and the downlink direction, based on a codec being used, a codec mode, a bit rate, a condition of a jitter buffer, or the like. Further, in the above-described packet loss rate report content, both the permissible packet loss rate in the uplink direction and the permissible packet loss rate in the downlink direction may be included, or either one of the permissible packet loss rate in the uplink direction and the permissible packet loss rate in the downlink direction may be included. Further, in the above-described packet loss rate report content, other information may be included.

Further, the above-described processing of receiving the report related to the packet loss rate received from the higher layer and transmitting the packet loss rate report content to the eNB may be performed in the RRC layer, or may be performed in the MAC layer. In a case that the processing is performed in the RRC layer, the above-described packet loss rate report content may be transmitted by using the RRC message. Further, in a case that the processing is performed in the MAC layer, the above-described packet loss rate report content may be transmitted by using the MAC control element (MAC CE).

FIG. 12 is an example of a packet loss rate report information element being a packet loss rate report format of a case that the transmission of the packet loss rate report content to the eNB is performed using the RRC message according to each embodiment of the present invention. As illustrated in FIG. 12, in the packet loss rate report information element, a field represented by dl-packetLossRate indicating the packet loss rate in the downlink direction may be included, or a field represented by ul-packetLossRate indicating the packet loss rate in the uplink direction may be included. In the field represented by dl-packetLossRate and the field represented by ul-packetLossRate, the respective values of the packet loss rates may be enumerated (ENUMERATED). plr1, plr2, plr2dot7, and plr4dot5 illustrated in FIG. 12, which are examples of the enumerated packet loss rates, may respectively represent the packet loss rate of 1 percent, the packet loss rate of 2 percent, the packet loss rate of 2.7 percent, and the packet loss rate of 4.5 percent. Further, a default value of the packet loss rate may be specified. In the example of FIG. 11, as the default value of the packet loss rate, 1 percent indicated by plr1 is specified.

The packet loss rate report information element may be included in a UE assistance information (UEAssistanceInformation) message described in NPL 4, may be included in a UE information response (UEInformationResponse) message in a UE Information procedure described in NPL 4, or may be included in another message.

Figure 13:
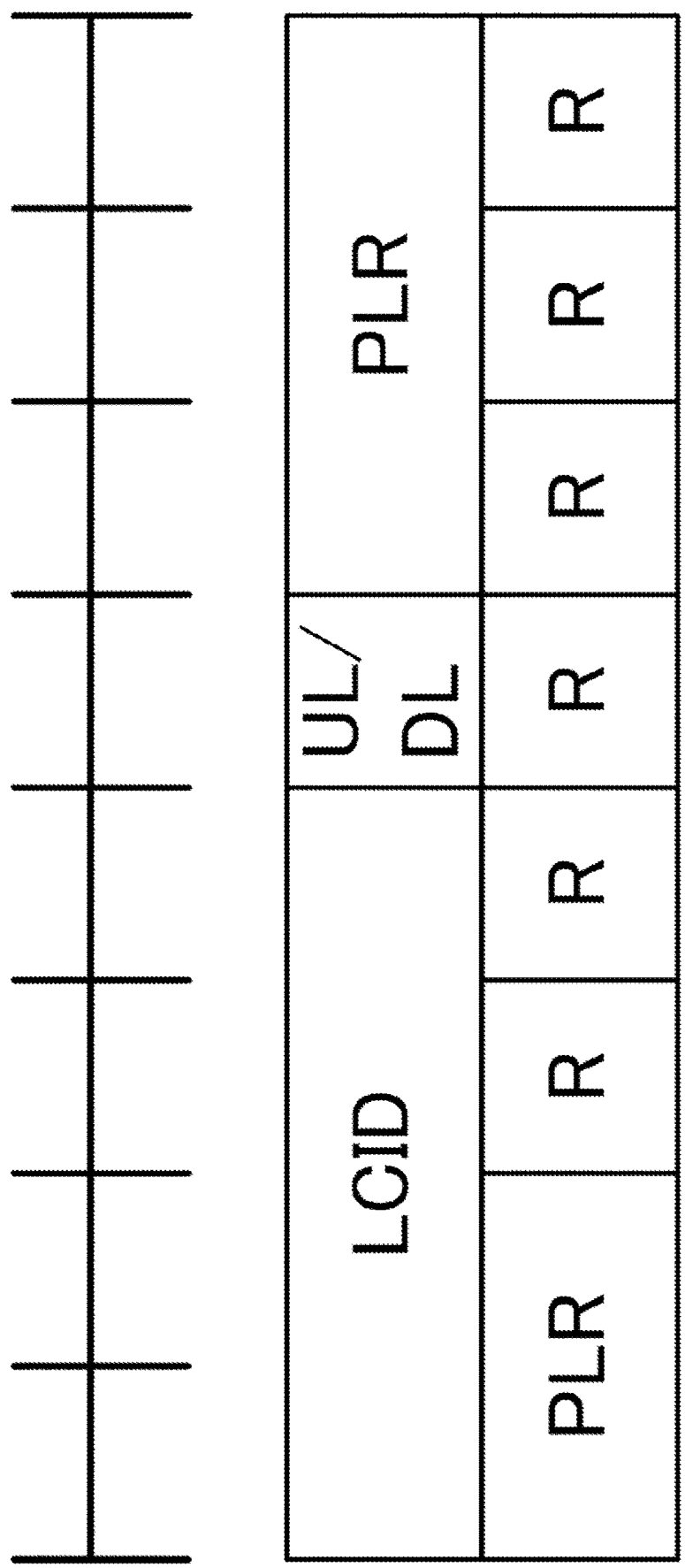
FIG. 13 is an example of a packet loss rate report MAC CE being a packet loss rate report format of a case that transmission of a packet loss rate report content to the eNB is performed using a MAC CE according to each embodiment of the present invention.

FIG. 13 is an example of a packet loss rate report MAC CE being a packet loss rate report format of a case that the transmission of the packet loss rate report content to the eNB is performed using the MAC CE according to each embodiment of the present invention. The field represented by LCD of FIG. 13 is a field of a logical channel identifier, and may signify an identifier of the logical channel in which the packet loss rate report is performed. The identifier of the logical channel for the packet loss rate report may be configured in a table of the logical channel identifier for an Uplink Shared Channel (UL-SCH) described in NPL 7.

The field represented by UL/DL may indicate whether the packet loss rate report is a report related to the uplink or is a report related to the downlink. For example, in a case that '0' is configured, the packet loss rate report may be the report related to the uplink, whereas in a case that '1' is configured, the packet loss rate report may be the report related to the downlink.

The field represented by PLR may be a field indicating the Packet Loss Rate.

Figure 14:
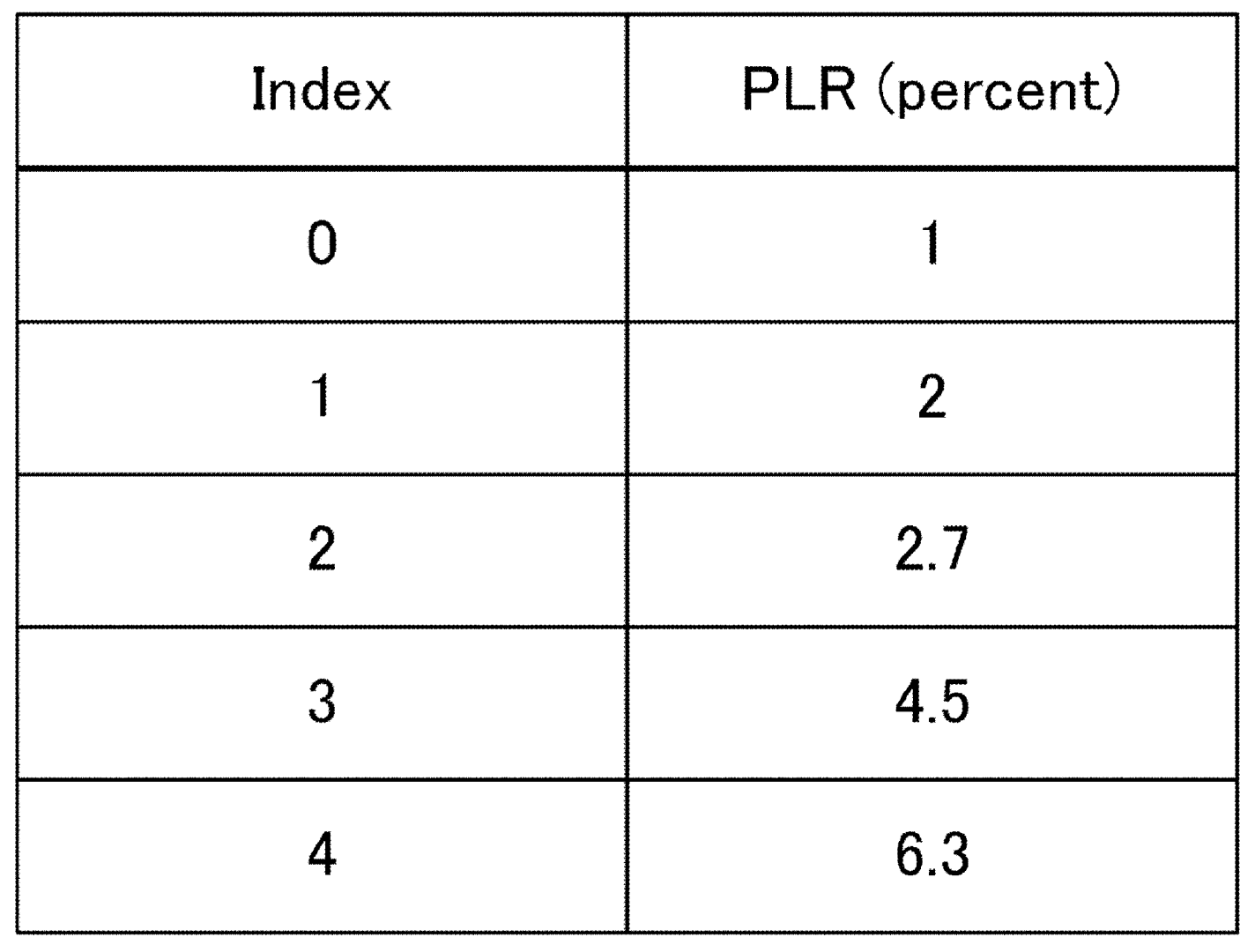

FIG. 14 illustrates an example of a table of values for the packet loss rate according to each embodiment of the present invention. The table of values for the packet loss rate includes a list of the packet loss rates (percent), and indexes for the respective packet loss rates. The field represented by PLR of FIG. 13 may include the index illustrated in the example of FIG. 14.

The field represented by R is a field indicating reservation (Reserve), and '0' may be set.

The field length of each field illustrated in FIG. 13 need not be the same as the field length illustrated in FIG. 13. Further, in the fields illustrated in FIG. 13, a part of the fields of may not be present, and another field may be present. Further, the indexes and the packet loss rates illustrated in FIG. 14 are merely examples, and need not be the same as the illustrated indexes and packet loss rates.

Further, an example of a processing method in a case that the transmission of the packet loss rate report content to the eNB is performed using the MAC CE may be as follows. In other words, in a case that a MAC entity receives a report related to the packet loss rate from the higher layer for a specified logical channel, the MAC entity triggers the packet loss rate report for the specified logical channel, direction, and packet loss rate, based on the fact that the packet loss rate report for the direction (the uplink, or the downlink, or the uplink and the downlink) included in the above-described report related to the packet loss rate is not triggered for the specified logical channel.

In a case that resources for new uplink transmission are assigned to the MAC entity, the packet loss rate report is canceled by creating the above-described MAC CE for the specified logical channel, direction, and packet loss rate for the packet loss rate report that is triggered and not canceled. Note that the above-described MAC CE creation processing may be performed based on the fact that the packet loss rate report prohibit timer is not in operation, or the packet loss rate report prohibit timer may be started before the above-described packet loss rate report is canceled.

As described above, in Embodiment 1 of the present invention, with the UE performing reporting of the packet loss rate to the eNB in a case that the UE receives a report related to the packet loss rate from the higher layer, a threshold of an SRVCC handover or the like in consideration of the packet loss rate that can be allowed by the higher layer of the UE can be determined in the eNB. In other words, the terminal apparatus can reduce deterioration of phone call quality, and efficiently perform communication.

EMBODIMENT 2

Embodiment 2 of the present invention will be described with reference to FIG. 1 to FIG. 9, FIG. 12 to FIG. 14, and FIG. 15 to FIG. 16. FIG. 1 to FIG. 9 and FIG. 12 to FIG. 14 are the same as those of Embodiment 1, but will be described again in Embodiment 2 as well.

FIG. 6 is a diagram illustrating an example of a flow of a UE capability procedure and an RRC connection reconfiguration procedure according to each embodiment of the present invention. Note that the RRC connection reconfiguration procedure may be an RRC reconfiguration procedure.

The UE capability procedure (UE capability transfer) is a means used to Transfer Radio access capability information of the UE 122 from the UE 122 to a network in LTE and/or NR.

The RRC connection reconfiguration procedure (RRC Connection Reconfiguration) is a procedure used for handover, Measurement, and the like in addition to establishment, change, and release of an RB, a change, a release, and the like of a secondary cell in LTE (E-UTRA) described in NPL 4. In contrast, the RRC reconfiguration procedure (RRC Connection Reconfiguration) is a procedure used for handover (reconfiguration involving synchronization), Measurement, and the like in addition to establishment, change, and release of an RB, a change, a release, and the like of a secondary cell in NR described in NPL 10. Regarding the RRC connection reconfiguration procedure, in the MR-DC, particularly in a case of E-UTRA-NR Dual Connectivity (EN-DC) being the MR-DC of a case that the core network is the EPC 104 and a master node is the eNB 102 and NG-RAN E-UTRA-NR Dual Connectivity (NGEN-DC) being the MR-DC of a case that the core network is the 5GC 110 and a master node is the eNB 102 (also referred to as an enhanced eNB 102), and further a case that the enhanced eNB 102 uses the 5GC 110 as the core network, the RRC connection reconfiguration procedure is also used for a part of the handover, the Measurement, and the like in addition to a part of the establishment, the change, and the release of the RB, and the change, the release, and the like of the secondary cell in NR described in NPL 10 as well as LTE. In each embodiment of the present invention, in order to avoid complexity of description, description is given by using the term "RRC connection reconfiguration procedure", and description is given by using the eNB 102 as the base station apparatus.

In the UE capability procedure, the eNB 102 transmits, to the UE 122, a UE capability enquiry (UECapabilityEnquiry) message for enquiring of the UE 122 about the UE Capability (Step S600). Based on the UE capability enquiry received from the eNB 102, the UE 122 creates a UE capability information (UECapabilityInformaion) message, and transmits the UE capability information message to the eNB 102 (Step S602). Note that other terms may be used for the messages such as the UE capability enquiry message and the UE capability information message.

Next, in the RRC connection reconfiguration procedure, based on the UE capability information acquired in the UE capability procedure, the eNB 102 creates an RRC connection reconfiguration message (RRCConnectionReconfigration), and transmits the RRC connection reconfiguration message to the UE 122 (Step S604). The UE 122 performs processing of various configurations, for example, a configuration of a prohibit timer, a configuration of a transmission period timer, and the like, according to information elements to be described later included in the RRC connection reconfiguration message. After Step S604, the UE 122 may transmit an RRC connection reconfiguration complete message (RRCConnectionReconfigrationComplete) and the like to the eNB 102 (not illustrated). Note that the RRC reconfiguration message may be replaced with RRC reconfiguration, and the RRC reconfiguration complete message may be replaced with RRC reconfiguration complete.

FIG. 7 is a block diagram illustrating a configuration of the terminal apparatus (UE 122) according to each embodiment of the present invention. Note that FIG. 7 illustrates only the main components closely related to the present invention in order to avoid complexity of description.

The UE 122 illustrated in FIG. 7 includes a reception unit 700 that receives, from the eNB 102, a message such as the UE capability enquiry message and the RRC connection reconfiguration message, the MAC Control Element (MAC CE), a report from the higher layer, and the like, a processing unit 702 that performs processing according to the various Information Elements (IEs) and various conditions such as a field included in the received message, the report from the higher layer, and the like, and a transmission unit 704 that transmits, to the eNB 102, a message such as the UE capability information message, the MAC Control Element (MAC CE), the report to the higher layer, and the like. A controller controlling operations of the units based on various conditions may be separately provided.

FIG. 8 is a block diagram illustrating a configuration of the base station apparatus (eNB 102) according to each embodiment of the present invention. Note that FIG. 8 illustrates only the main components closely related to one aspect of the present invention in order to avoid complexity of description.

The eNB 102 illustrated in FIG. 8 includes a transmission unit 800 that transmits, to the UE 122, a message such as the UE capability enquiry message and the RRC connection reconfiguration message, the MAC Control Element (MAC CE), and the like, a processing unit 802 that causes the processing unit 702 of the UE 122 to perform processing by creating a message including various Information Elements (IEs), a field, and the like and transmitting the message to the UE 122, and a reception unit 804 that receives, from the UE 122, a message such as the UE capability information message, the MAC Control Element (MAC CE), and the like. Note that the configuration illustrated in FIG. 8 may be applied to the gNB 108. In a case that the configuration is applied to the gNB 108, the message transmitted from the transmission unit 800 to the UE 122 may be the RRC reconfiguration message. A controller controlling operations of the units based on various conditions may be separately provided.

Next, the information elements used in the UE capability procedure will be described.

FIG. 9 is an example of ASN.1 description representing the information elements included in the UE capability information message of FIG. 6 according to each embodiment of the present invention.

In 3GPP, in the specifications related to RRC (NPL 4, NPL 10), the messages, the Information Elements (IEs), and the like related to RRC are described using ASN.1. The message and/or the information element related to RRC includes one or multiple fields or Values of the fields. As the value of the field, other information elements in addition to an integer, a byte sequence, a list, and the like can be used. In a case that the value of each field of the message and/or the information element related to RRC is represented by the information element, in the embodiment of the present application, "field" may be described by being replaced by "information element". In the example of ASN.1 illustrated in FIG. 9, <omitted> and <partly omitted> are not part of the notation of ASN.1 and mean that other information is omitted. Note that there may also be omitted a field in a part where neither <omitted> nor <partly omitted> is indicated. Note that the example of ASN.1 illustrated in FIG. 9 does not correctly follow the ASN.1 notation method but represents notation of an example of parameters of the RRC reconfiguration according to the present invention, and other designations and other notations may be used. In addition, in order to avoid complexity of description, the example of ASN.1 illustrated in FIG. 9 represents only an example relating to main information that is closely related to one aspect of the present invention. Note that the above description is also applied to other ASN.1 description according to the embodiment of the present application unless there is other explicit description.

In FIG. 9, the information element represented by UE-CapabilityRAT-ContainerList included in the capability information message has a list of containers represented by UE-CapabilityRAT-Container of the information elements as its Value, and the UE capability may be included in one container for each RAT. UE-CapabilityRAT-Container may include a rat-Type field having information indicating a Type of the Radio Access Technology (RAT) as its value, and a ueCapabilityRAT-Container field having a byte sequence indicating the UE capability of the RAT that is indicated by rat-Type as its value. In a case that the value of rat-Type of UE-CapabilityRAT-Container is associated with EUTRA, a UE-EUTRA-Capability information element may be included in the value of the ueCapabilityRAT-Container field. In addition, in a case that the value of rat-Type of UE-CapabilityRAT-Container is associated with NR, an information element for NR, for example, a UE-NR-Capability information element, may be included in the value of the ueCapabilityRAT-Container field.

An mmtel-Parameters field included in the UE-NR-Capability information element may have an MMTEL-Parameters information element as its value. The MMTEL-Parameters information element may include whether or not an auxiliary function for VoIP using the IMS of the UE 122, for example, a delay budget report, is supported, whether or not a recommended bit rate reception is supported, and the like.

In addition, as illustrated in FIG. 9, in the MMTEL-Parameters information element, a field (packetLossRateReporting) indicating whether or not the UE 122 supports a packet loss rate report may be included. In this case, in a case that a packetLossRateReporting field is not included in the MMTEL-Parameters information element, it may be indicated that the packet loss rate report is not supported. The packet loss rate report may refer to reporting of the permissible packet loss rate from the UE 122 to the eNB 102, based on a command and information from the higher layer.

Note that the inclusion of the packetLossRateReporting field in the MMTEL-Parameters information element is merely an example, and the packetLossRateReporting field may be included in another information element.

Next, the information elements used in the RRC connection reconfiguration procedure will be described.

FIG. 15 is an example of ASN.1 description representing the information elements included in the RRC connection reconfiguration message of FIG. 6 according to Embodiment 2 of the present invention.

In FIG. 15, the information element represented by RRC-ConnectionReconfiguration-IEs being the information element of the RRC connection reconfiguration may include the information elements related to measurement, the information element related to radio resource configuration, and the like, as well as the information element represented by OtherConfig being the information element related to other configurations.

In the example of FIG. 15, in the information element represented by OtherConfig, a field represented by packetLossRateReportingConfig, which is a field representing a configuration for the above-described packet loss rate report, may be included. The field represented by packetLossRateReportingConfig may have a structure of selecting (CHOICE) a field represented by release that signifies release and a field represented by setup that signifies configuration. Further, the field represented by setup may include as a field (packet loss rate report periodic timer field) represented by packetLossRatePeriodicTimer, which is a field related to a configuration of a packet loss rate report periodic timer being a period for transmitting the above-described packet loss rate report, and the values of the field represented by packetLossRatePeriodicTimer may be enumerated (ENUMERATED) as the values of the packet loss rate report periodic timer. Note that, in the example of FIG. 15, the packet loss rate report periodic timer is not separated into the usage for the uplink and for the downlink, but the packet loss rate report periodic timer may be separated into the field for the uplink and the field for the downlink.

Note that the inclusion of the field represented by packetLossRatePeriodicTimer in the OtherConfig information element is merely an example, and the field represented by packetLossRatePeriodicTimer may be included in, for example, another information element such as an information element indicating a configuration of a logical channel in MAC. In addition to the above, the information element indicating a configuration of a logical channel may include a field indicating priority of the logical channels, an identifier of a logical channel group, a field indicating association, or the like.

An example of a processing method of the UE 122 according to Embodiment 2 of the present invention will be described with reference to FIG. 16.

The processing unit 802 of the eNB 102 creates the UE capability enquiry message including the field indicating the packet loss rate report and transmits the UE capability enquiry message to the UE 122 via the transmission unit 800 in order to cause the UE 122 to perform processing (not illustrated). The reception unit 700 of the UE 122 receives the UE capability enquiry message from the eNB 102. In a case that the processing unit 702 of the UE 122 supports the packet loss rate report, the processing unit 702 performs processing of creating the UE capability information message including the field indicating the packet loss rate report, and transmits the UE capability information message via the transmission unit 704 (Step S1600). The reception unit 804 of the eNB 102 receives the UE capability information message from the UE112 (not illustrated).

Next, the processing unit 802 of the eNB 102 creates the RRC connection reconfiguration message including a field representing a configuration for the packet loss rate report for causing the UE 122 to perform processing, and transmits the RRC connection reconfiguration message to the UE 122 via the transmission unit 800 (not illustrated). The reception unit 700 of the UE 122 receives the RRC connection reconfiguration message from the eNB 102. The processing unit 702 of the UE 122 may perform processing of configuring the packet loss rate report, based on the field representing the configuration for the packet loss rate report included in the RRC connection reconfiguration message received from the eNB 102 (Step 1602). The processing of configuring the packet loss rate report may be, for example, processing in which it is determined that transmission of the packet loss rate report is configured in a case that the field represented by packetLossRateReportingConfig indicates configuration (setup), it is determined that the packet loss rate report is not to be transmitted in a case that the field represented by packetLossRateReportingConfig indicates other than configuration (setup), for example, release, and the packet loss rate transmission period timer is stopped in a case that the timer is in operation. Further, in a case that it is determined that the above-described transmission of the packet loss rate report is configured, the processing may be processing of starting the packet loss rate transmission period timer. Further, based on the determination that the above-described transmission of the packet loss rate report is configured, the fact that the packet loss rate report is to be performed may be reported to the higher layer.

In a case that the packet loss rate transmission period timer expires, the processing unit 702 of the UE 122 creates a packet loss rate report content according to the content of the report received from the higher layer, and transmits the packet loss rate report content to the eNB 102 (Step 1604). In a case that the UE 122 does not receive the report related to the packet loss rate from the higher layer in a case that the packet loss rate transmission period timer expires, the UE 122 may transmit a default packet loss rate or enquire of the higher layer. The above-described creation of the packet loss rate report content and transmission to the eNB 102 may be performed based on the determination that the transmission of the packet loss rate report in above Step S1102 is configured.

Further, the packet loss rate report content may be created according to the content of the report received from the higher layer and is transmitted to the eNB 102 in a case that a Query is received from the eNB 102 in addition to the case that the above-described packet loss rate report periodic timer expires, and the packet loss rate report content may be created according to the content of the report received from the higher layer in a case that a Query is received from the eNB 102 instead of the case that the above-described packet loss rate report periodic timer expires. Further, in the case that the packet loss rate report content is created according to the content of the report received from the higher layer and is transmitted to the eNB 102 in a case that a Query is received from the eNB 102 in addition to the case that the above-described packet loss rate report periodic timer expires, the packet loss rate report periodic timer may be reset or restarted in a case that the Query is received from the eNB 102. Further, in a case that the UE 122 does not receive the report related to the packet loss rate from the higher layer in a case that the UE 122 receives a Query from the eNB 102, the UE 122 may transmit a default packet loss rate, or may make an enquiry of the higher layer and receive the report related to the packet loss rate. Further, every time the Query is received from the eNB 102, an enquiry may be made of the higher layer and the report related to the packet loss rate may be received.

Note that, in the above-described report related to the packet loss rate received from the higher layer, both the permissible packet loss rate in the uplink direction and the permissible packet loss rate in the downlink direction may be included, or either one of the permissible packet loss rate in the uplink direction and the permissible packet loss rate in the downlink direction may be included. Further, in the above-described report related to the packet loss rate received from the higher layer, other information may be included. Further, the higher layer may perform calculation, determination, or the like of the above-described permissible packet loss rate in the uplink direction and the downlink direction, based on a codec being used, a codec mode, a bit rate, a condition of a jitter buffer, or the like. Further, in the above-described packet loss rate report content, both the permissible packet loss rate in the uplink direction and the permissible packet loss rate in the downlink direction may be included, or either one of the permissible packet loss rate in the uplink direction and the permissible packet loss rate in the downlink direction may be included. Further, in the above-described packet loss rate report content, other information may be included.

Further, the above-described processing of receiving the report related to the packet loss rate received from the higher layer and transmitting the packet loss rate report content to the eNB and the above-described processing of receiving the Query from the eNB and transmitting the packet loss rate report content to the eNB may be performed in the RRC layer, or may be performed in the MAC layer. In a case that the processing is performed in the RRC layer, the above-described packet loss rate report content and Query may be transmitted and/or received by using the RRC message. Further, in a case that the processing is performed in the MAC layer, the above-described packet loss rate report content and Query may be transmitted and/or received by using the MAC control element (MAC CE).

FIG. 12 is an example of a packet loss rate report information element being a packet loss rate report format of a case that the transmission of the packet loss rate report content to the eNB is performed using the RRC message according to each embodiment of the present invention. As illustrated in FIG. 12, in the packet loss rate report information element, a field represented by dl-packetLossRate indicating the packet loss rate in the downlink direction may be included, or a field represented by ul-packetLossRate indicating the packet loss rate in the uplink direction may be included. In the field represented by dl-packetLossRate and the field represented by ul-packetLossRate, the respective values of the packet loss rates may be enumerated (ENUMERATED). plr1, p1r2, plr2dot7, and plr4dot5 illustrated in FIG. 12, which are examples of the enumerated packet loss rates, may respectively represent the packet loss rate of 1 percent, the packet loss rate of 2 percent, the packet loss rate of 2.7 percent, and the packet loss rate of 4.5 percent. Further, a default value of the packet loss rate may be specified. In the example of FIG. 11, as the default value of the packet loss rate, 1 percent indicated by plr1 is specified.

The packet loss rate report information element may be included in a UE assistance information (UEAssistanceInformation) message described in NPL 4, may be included in a UE information response (UEInformationResponse) message in a UE Information procedure described in NPL 4, or may be included in another message.

Further, in a case that the Query transmission from the eNB is performed in the RRC message as well, a format similar to the packet loss rate report format illustrated in FIG. 12 may be applied as a field for packet loss rate report enquiry, or another format may be used as the field for packet loss rate report enquiry. Further, the field used for the Query may be included in a UE information request (UEInformationRequest) message in a UE Information procedure described in NPL 4, for example, or may be included in another message.

FIG. 13 is an example of a packet loss rate report MAC CE being a packet loss rate report format of a case that the transmission of the packet loss rate report content to the eNB is performed using the MAC CE according to each embodiment of the present invention. The field represented by LCD of FIG. 13 is a field of a logical channel identifier, and may signify an identifier of the logical channel in which the packet loss rate report is performed. The identifier of the logical channel for the packet loss rate report may be configured in a table of the logical channel identifier for an Uplink Shared Channel (UL-SCH) described in NPL 7.

The field represented by UL/DL may indicate whether the packet loss rate report is a report related to the uplink or is a report related to the downlink. For example, in a case that '0' is configured, the packet loss rate report may be the report related to the uplink, whereas in a case that '1' is configured, the packet loss rate report may be the report related to the downlink.

The field represented by PLR may be a field indicating the Packet Loss Rate.

FIG. 14 illustrates an example of a table of values for the packet loss rate according to each embodiment of the present invention. The table of values for the packet loss rate includes a list of the packet loss rates (percent), and indexes for the respective packet loss rates. The field represented by PLR of FIG. 13 may include the index illustrated in the example of FIG. 14.

The field represented by R is a field indicating reservation (Reserve), and '0' may be set.

The field length of each field illustrated in FIG. 13 need not be the same as the field length illustrated in FIG. 13. Further, in the fields illustrated in FIG. 13, a part of the fields may not be present, and another field may be present. Further, the indexes and the packet loss rates illustrated in FIG. 14 are merely examples, and need not be the same as the illustrated indexes and packet loss rates. Further, in the indexes illustrated in FIG. 14, an index indicating the default packet loss rate may be included.

Further, a packet loss rate report enquiry format of a case that the transmission of the Query from the eNB is performed using the MAC CE may be a format the same as the format of the packet loss rate report MAC CE illustrated in FIG. 13, or may be another format. Further, an identifier of the logical channel for packet loss rate report enquiry may be configured in a table of the logical channel identifier for a Downlink Shared Channel (DL-SCH) described in NPL 7.

Further, an example of a processing method in a case that the transmission of the packet loss rate report content to the eNB is performed using the MAC CE may be as follows. In other words, in a case that a packet loss rate periodic timer for a specified logical channel expires or in a case that a MAC entity receives the MAC CE for the Query from the eNB on the specified logical channel, the MAC entity triggers the packet loss rate report for the specified logical channel, direction, and packet loss rate, based on the fact that the packet loss rate report for the specified direction (the uplink, or the downlink, or the uplink and the downlink) is not triggered for the specified logical channel.

In a case that resources for new uplink transmission are assigned to the MAC entity, the packet loss rate report is canceled by creating the above-described MAC CE for the specified logical channel, direction, and packet loss rate for the packet loss rate report that is triggered and not canceled.

As described above, in Embodiment 2 of the present invention, with the UE periodically performing reporting of the packet loss rate to the eNB, a threshold of an SRVCC handover or the like in consideration of the packet loss rate that can be allowed by the higher layer of the UE can be determined in the eNB. In other words, the terminal apparatus can reduce deterioration of phone call quality, and efficiently perform communication.

Note that, in each embodiment of the present invention, in a case that the UE capability information related to the packet loss rate report is transmitted to the eNB 102, the fact that the packet loss rate report is to be performed may be reported to the higher layer.

Note that each embodiment of the present invention has described an example in which the information related to the packet loss rate is received from the higher layer and the packet loss rate report is transmitted to the base station. The information, however, may be other information corresponding to the packet loss rate.

Note that each embodiment of the present invention has provided description of the communication between the UE and the eNB. However, each embodiment of the present invention may be applied to communication between the UE and the gNB, or may be applied to other RATs.

Note that, in each embodiment of the present invention, the MAC control element (MAC CE) may be a MAC control element Protocol Data Unit (PDU). Further, regarding the MAC CE, a part of data transmitted and/or received between the terminal and the base station may be used for the RRC message transmitted and/or received between the terminal and the base station.

Note that, in a case that the packet loss rate report prohibit timer according to Embodiment 1 of the present invention and the packet loss rate report periodic timer according to Embodiment 2 of the present invention operate in a case of reestablishment of the RRC connection and Resumption of the RRC connection, the packet loss rate report prohibit timer and the packet loss rate report periodic timer may be stopped.

Further, each embodiment of the present invention has described the packet loss rate as a method of reporting the information held by the higher layer from the terminal apparatus to the base station by receiving a report from the higher layer. This scheme, however, may be applied to delay budget reporting described in NPL 4 or the like.

A program operating on an apparatus according to the present invention may serve as a program that controls a Central Processing Unit (CPU) and the like to cause a computer to operate in such a manner as to realize the functions of the above-described embodiments according to the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Note that the apparatuses in the above-described embodiments may be partially enabled by a computer. In such a case, a program for realizing such control functions may be recorded on a computer-readable recording medium to cause a computer system to read the program recorded on the recording medium to perform the program. It is assumed that the "computer system" mentioned here refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the above-described program may be configured to realize some of the functions described above, and additionally may be configured to realize the functions described above, in combination with a program already recorded in the computer system.

Furthermore, each functional block or various characteristics of the apparatuses used in the above-described embodiments may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may include a digital circuit, or may include an analog circuit. Furthermore, in a case that with advances in semi-conductor technology, a circuit integration technology appears that replaces the present integrated circuits, it is also possible to use an integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. In addition, a configuration in which components, which are described in the embodiment described above, having similar effects are interchanged is also included in the present invention.

What is claimed is:

1. A terminal apparatus for communicating with a base station apparatus, the terminal apparatus comprising:
   a reception unit configured to receive a radio resource control (RRC) message from the base station apparatus; and:
   a processing unit configured to:
   configure a packet loss rate report prohibit timer according to a packet loss rate report prohibit timer field included in the RRC message; and
   based on reception of a report of a packet loss rate from a higher layer when the packet loss rate report prohibit timer is not running, create packet loss rate report content according to content of the report of the packet loss rate received from the higher layer, start the packet loss rate report prohibit timer, and transmit the packet loss rate report content to the base station apparatus, wherein
   the packet loss rate report content includes information of a direction for indicating whether the direction is an uplink direction or a downlink direction, and information related to the packet loss rate.

2. A terminal apparatus for communicating with a base station apparatus, the terminal apparatus comprising:
   a reception unit configured to receive a radio resource control (RRC) message from the base station apparatus, the RRC message comprising a packet loss rate report configuration; and
   a processing unit configured to:
   configure based on the received packet loss rate report configuration;
   after determining that the timer has expired, determining whether packet loss rate content is received from a higher layer in a New Radio (NR) protocol stack by a lower layer of the NR protocol stack;
   when the lower layer determines that the packet loss rate content is received from the higher layer, transmit a packet loss rate report to the base station apparatus, wherein the packet loss rate report comprises information related to packet loss rate direction including a direction of the packet loss rate being associated with an uplink direction or a downlink direction.

3. The terminal apparatus according to claim 1, wherein the packet loss rate report content is included in an RRC message transmitted to the base station apparatus.

4. The terminal apparatus according to claim 1, wherein the packet loss rate report content is included in a medium access control (MAC) control element transmitted to the base station apparatus.

5. A base station apparatus for communicating with a terminal apparatus, the base station apparatus comprising:
   a transmission unit configured to transmit a radio resource control (RRC) message to the terminal apparatus; and
   a processing unit configured to cause the terminal apparatus to perform processing by including a packet loss rate report prohibit timer field in the RRC message, wherein:
   the processing comprises, based on reception of a report of a packet loss rate from a higher layer when a packet loss rate report prohibit timer is not running, creating packet loss rate report content according to content of the report of the packet loss rate received from the higher layer, starting the packet loss rate report prohibit timer, and transmitting the packet loss rate report content to the base station apparatus; and
   the packet loss rate report content includes information of a direction for indicating whether the direction is an uplink direction or a downlink direction, and information related to the packet loss rate.

6. A base station apparatus for communicating with a terminal apparatus, the base station apparatus comprising:
   a transmission unit configured to transmit a radio resource control (RRC) message to the terminal apparatus, the RRC message comprising a packet loss rate report configuration; and
   a processing unit configured to cause the terminal apparatus to perform processing, wherein:
   the processing comprises:
   configuring a timer based on the received packet loss rate report configuration,
   after the timer has expired, determining whether packet loss rate content is received from a higher layer in a New Radio (NR) protocol stack by a lower layer of the NR protocol stack,
   when the lower layer determines that the packet loss rate content is received from the higher layer, transmitting a packet loss rate report to the base station apparatus, and
   the packet loss rate report comprises information related to packet loss rate direction including a direction of the packet loss rate being associated with an uplink direction or a downlink direction.

7. A method for a terminal apparatus for communicating with a base station apparatus, the method comprising:
   receiving a radio resource control (RRC) message from the base station apparatus;
   configuring a packet loss rate report prohibit timer according to a packet loss rate report prohibit timer field included in the RRC message; and
   based on reception of a report of a packet loss rate from a higher layer when the packet loss rate report prohibit timer is not running, creating packet loss rate report content according to content of the report of the packet loss rate received from the higher layer, starting the packet loss rate report prohibit timer, and transmitting the packet loss rate report content to the base station apparatus, wherein
   the packet loss rate report content includes information of a direction for indicating whether the direction is an uplink direction or a downlink direction, and information related to the packet loss rate.

8. A method performed by a terminal apparatus for communicating with a base station apparatus, the method comprising:
   receiving a radio resource control (RRC) message from the base station apparatus, the RRC message comprising a packet loss rate report configuration;
   configuring a timer based on the received packet loss rate report configuration;
   after determining that the timer has expired, determining whether packet loss rate content is received from a higher layer in a New Radio (NR) protocol stack by a lower layer of the NR protocol stack;

when the lower layer determines that the packet loss rate content is received from the higher layer, transmitting a packet loss rate report to the base station apparatus, wherein the packet loss rate report comprises information related to packet loss rate direction including a direction of the packet loss rate being associated with an uplink direction or a downlink direction.

9. A method for a base station apparatus for communicating with a terminal apparatus, the method comprising:

transmitting a radio resource control (RRC) message to the terminal apparatus; and including a packet loss rate report prohibit timer field in the RRC message and causing the terminal apparatus to perform processing, wherein:

the processing comprises, based on reception of a report of a packet loss rate from a higher layer when a packet loss rate report prohibit timer is not running, creating packet loss rate report content according to content of the report of the packet loss rate received from the higher layer, starting the packet loss rate report prohibit timer, and transmitting the packet loss rate report content to the base station apparatus; and the packet loss rate report content includes information of a direction for indicating whether the direction is an uplink direction or a downlink direction, and information related to the packet loss rate.

10. A method performed by a base station apparatus for communicating with a terminal apparatus, the method comprising:

transmitting a radio resource control (RRC) message to the terminal apparatus, the RRC message comprising a packet loss rate report configuration; and causing the terminal apparatus to perform processing, wherein:

the processing comprises:

configuring a timer based on the received packet loss rate report configuration, after the timer has expired, determining whether packet loss rate content is received from a higher layer in a New Radio (NR) protocol stack by a lower layer of the NR protocol stack, when the lower layer determines that the packet loss rate content is received from the higher layer, transmitting a packet loss rate report content to the base station apparatus, and the packet loss rate report comprises information related to packet loss rate direction including a direction of the packet loss rate being associated with an uplink direction or a downlink direction.

11. The terminal apparatus according to claim 2, wherein the packet loss rate report is included in an RRC message transmitted to the base station apparatus.

12. The terminal apparatus according to claim 2, wherein the packet loss rate report is included in a medium access control (MAC) control element transmitted to the base station apparatus.

13. The terminal apparatus according to claim 2, wherein the processing unit is further configured to:

receive, from the base station apparatus, an inquiry on the terminal apparatus's capability of generating the packet loss rate report; and transmit a response to the inquiry on the terminal apparatus's capability of generating the packet loss rate report to the base station apparatus before receiving the RRC message.

14. The terminal apparatus according to claim 2, wherein the packet loss rate report further comprises a permissible packet loss rate.

15. The terminal apparatus according to claim 2, wherein:

when packet loss rate processing is performed by an RRC layer, the terminal apparatus transmits the packet loss rate report in an RRC message, and when the packet loss rate processing is performed by a medium access control (MAC) layer, the terminal apparatus transmits the packet loss rate report in a MAC control element (CE).

16. The terminal apparatus according to claim 2, wherein the processing unit is further configured to transmit a default packet loss rate to the base station apparatus after the timer has expired and the lower layer determines that the packet loss rate content is not received from the higher layer.

17. The method according to claim 8, further comprising:

receiving, from the base station apparatus, an inquiry on the terminal apparatus's capability of generating the packet loss rate report; and transmitting a response to the inquiry on the terminal apparatus's capability of generating the packet loss rate report to the base station apparatus before receiving the RRC message.

18. The method according to claim 8, wherein the packet loss rate report further comprises a permissible packet loss rate.

19. The method according to claim 8, further comprising:

transmitting the packet loss rate report in an RRC message when packet loss rate processing is performed by an RRC layer; and transmitting the packet loss rate report in a medium access control (MAC) control element (CE) when the packet loss rate processing is performed by a MAC layer.

20. The method according to claim 8, further comprising:

transmitting a default packet loss rate to the base station apparatus after the timer has expired and the lower layer determines that the packet loss rate content is not received from the higher layer.

* * * * *